United States Patent
Komamura et al.

[11] Patent Number: 5,892,033
[45] Date of Patent: Apr. 6, 1999

[54] METALLIC CHELATING DYE

[75] Inventors: Tawara Komamura; Akira Onishi; Tatsuo Tanaka; Yoriko Nakayama; Mari Honda; Norio Miura, all of Hino, Japan

[73] Assignee: Konica Corporation, Japan

[21] Appl. No.: 711,717

[22] Filed: Sep. 4, 1996

[30] Foreign Application Priority Data

Sep. 7, 1995 [JP] Japan .................................. 7-230273
Oct. 27, 1995 [JP] Japan .................................. 7-280483

[51] Int. Cl.$^6$ ...................... C07D 471/04; C07D 401/04
[52] U.S. Cl. .................... 544/225; 544/300; 544/331; 544/357; 544/405; 546/2; 546/94; 546/256; 546/269.7; 546/270.1; 546/271.7; 546/272.1; 546/272.4; 546/276.1; 548/101; 548/108; 548/159; 548/204
[58] Field of Search ..................... 544/225, 300, 544/331, 357, 405; 546/2, 94, 256, 269.7, 270.1, 271.7, 272.1, 272.4, 276.1; 548/101, 108, 159, 204

[56] References Cited

U.S. PATENT DOCUMENTS

| | | | |
|---|---|---|---|
| 3,544,325 | 12/1970 | Depoorter et al. | 96/84 |
| 4,725,685 | 2/1988 | Lotsch | 544/225 |
| 5,340,707 | 8/1994 | Ohnishii et al. | 430/522 |

FOREIGN PATENT DOCUMENTS 0183193  11/1985  European Pat. Off. .

OTHER PUBLICATIONS

European Search Report EP 96 30 6488 and Annex (1996).

Patent Abstracts of Japan vol. 9, No. 114 (M380) (1837) May 18, 1985.

Patent Abstracts of Japan, vol. 8, No. 189 (M–321) (1626) Aug. 30, 1984.

*Primary Examiner*—Richard L. Raymond
*Attorney, Agent, or Firm*—Jordan B. Bierman; Bierman, Muserlian and Lucas

[57] ABSTRACT

Disclosed is a metal chelate dye which is composed of a metal ion and a ligand that is a methine dye having 2 or more bonding positions capable of coordinate bond to the metal ion at the bonding position. A thermal transfer recording material, an ink used for an ink jet image recording process and a color toner for electrostatic image recording process are also disclosed.

4 Claims, 1 Drawing Sheet

METALLIC CHELATING DYE

FIELD OF THE INVENTION

The present invention relates to a metal chelate dye, having excellent color tone and high density, for obtaining favorable image stability, a thermal transfer recording material, a thermal transfer recording method, an ink-jet recording solution and color toner.

BACKGROUND OF THE INVENTION

Dyes known as dyes or pigments are widely utilized in various applications including coloring materials for fibers, colorants for resins and paints, image forming materials in photography, printing, copying machines and printers and light-absorption materials for color filters. Recently, various image forming dyes for color hard-copies employing ink jet technology, electrophotography technology, silver salt photography technology and thermal transfer technology were disclosed. In addition, together with the accelerating progress of electronic imaging, demand for dyes for photo-recording media utilizing a solid image pick-up tube, dyes for filters for color liquid crystal television and semiconductor lasers has been increased. Therefore, utilizing field of dyes have been extended.

Among the above-mentioned dyes, the thermal transfer recording has advantage in that operation and maintenance is easy, downsizing of the associated apparatus and further cost reduction is possible, and its running cost is inexpensive. In order to improve stability, specifically fixing property and light fastness, of an image obtained by the thermal transfer recording, a thermal recording material and an image forming method employing a chelatable thermo-diffusion dye (hereinafter, referred to as "chelate dye") have been reported. For example, they are reported in Japanese Patent Publication Open to Public Inspection (hereinafter, referred to as Japanese Patent O.P.I. Publication) Nos. 78893/1984, 10349/1984 and 2398/1985. The chelate dyes disclosed in the above-mentioned patent applications are metal chelate dyes wherein azo dyes are bidentate- or tridentate-cordinated with metal ions as a ligand. An image formed by the use of the above-mentioned chelate dyes is excellent in terms of light fastness and fixing property. However, it is not satisfactory in terms of sensitivity of thermal transfer recording material nor of the storage stability of the material itself. Therefore, further improvement has been demanded. Since hue change of the azo dye and that of the chelate dye after chelating is formed are remarkable, undesired secondary absorption occurs when chelating reaction, when an image is formed, is insufficient. In addition, the formed chelate dye itself is irregularly absorbed. Accordingly, when a full color image is obtained, further improvement in terms of color reproduction is demanded.

In addition, when the above-mentioned dye is used as an ink for ink jet printing, there are the following requirements: (a) it must be compatible with various recording methods (including (1) a method wherein solution drops are pressed and emitted by means of electromechanical conversion by means of Piezo element, (2) a method wherein solution drops are pressed and emitted by generating bubbles by means of electricity-heat conversion and (3) a method wherein solution drops are suctioned and emitted by means of static electricity), (b) having high recording density and favorable color tone, (c) being excellent in terms of image fastness to light, heat and moisture, (d) fixing fastness on the recording medium so that no blotting occurs after recording, (e) being excellent in terms of storage stability as an ink, (f) there are no problems in terms of safety such as toxicity and impressing and (g) it is inexpensive. From the above-mentioned viewpoints, various solutions for ink jet method are disclosed and studied. However, recording solutions satisfying many of the above-mentioned requirements concurrently are extremely limited. In color image recording employing a yellow, magenta, cyan and black color, dyes and pigments having conventional C.I. numbers described in the C.I. index have widely been studied. Those employing xanthene-containing water-solubilizing dyes such as Acid Red 52 and azo-containing water-solubilizing dyes such as Direct Red are known. However, the former has problems in terms of fastness such as light fastness and the latter has problems in terms of spectral absorption properties regarding color reproducibility, for example, lacking color tone sharpness.

Further, a case when the above-mentioned dye is used in color toner will now be discussed. In a color copier or a color printer utilizing an electrophotographic system, toner wherein a colorant is dispersed in resin particles or toner in which colorant is adhered on the surface of resin particles is ordinarily employed. It is difficult to achieve excellent effects when a method wherein a colorant is adhered on the surface of resin since it is coloring only on the surface of the resin. In addition, since the colorant is removed from the resin, charging performance changes. In addition, another problem occurs in that the surface of the fixing rollers is contaminated. Therefore, toners in which the colorant is dispersed in side the particles are widely employed. As performances required for such color toners, color reproducibility, image penetrability and light fastness in an Over Head Projector (hereinafter, referred to as "OHP") are cited. Toners in which a pigment is dispersed inside particles as a colorant are disclosed in Japanese Patent O.P.I. Publications Nos. 157051/1987, 255956/1987 and 118715/1994. Though these toners are excellent in terms of light fastness, they easily coagulate since they are insoluble. Therefore, they result in reduction in transmissivity and hue change of transmitting colors. In addition, toners wherein a dye is used as a colorant are disclosed in Japanese Patent O.P.I. Publications Nos. 276161/1991, 207274/1990 and 207273/1990. To the contrary, these toners have transmissivity so that they have problems in terms of light fastness, though there is no hue change.

It is desired that the above-mentioned dyes commonly have the following characteristics. Namely, they have preferable hue in terms of color reproduction, they have the most suitable spectral absorption characteristics, their image fastness to light, heat and moisture and chemical fastness is favorable. Further, their mol light absorption coefficient is large.

SUMMARY OF THE INVENTION

An object of the present invention is to provide a dye which overcomes the above-mentioned problems and requirements described in prior art, a thermal transfer recording material, a thermal transfer recording method, an ink jet recording solution and color toner which use the same.

A metal chelate dye of the invention is comprising a metal ion and a ligand that is a methine dye having 2 or more bonding positions capable of coordinate bond to the metal ion at the bonding position.

The atoms at the bonding positions of the methine dye are preferably nitrogen.

The preferable example of the methine dye is represented by the formula (1) or (2),

wherein $X_1$ and $X_2$ is individually a group of atoms having 2 or more bonding positions capable of coordinate bond, $Y_1$ is a group of atoms forming an aromatic hydrocarbon ring or a heterocyclic ring, $Y_2$ is a group of atoms forming a 5 or 6 membered aromatic hydrocarbon ring or heterocyclic ring, $R_1$, $R_2$, $R_3$, $R_{21}$, and $R_{22}$ are individually a hydrogen atom or a monovalent substituent, n and m are individually 0, 1 or 2.

In the above formulae (1) and (2), preferable example of $X_1$ and $X_2$ is individually

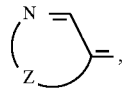

wherein Z is a group of atoms forming a nitrogen-containing heterocyclic ring substituted with a group containing at least one chelatable nitrogen atom.

The thermal transfer recording material of the invention comprises a support provided thereon with a thermal transfer element containig a metal chelate dye. One embodiment of the thermal transfer recording material comprises a dye providing element comprising a support and a layer containing the methine dye and the metal ion releasing compound. The other embodiment of thermal transfer recording material comprises the dye providing element comprising a support and a first layer containing the methine dye and a second layer containing the metal ion releasing compound.

Another embodiment of the thermal transfer recording material comprises a dye providing element and an image receiving element. The dye providing element comprises preferably a support and a layer containing the methine dye. The image receiving element comprises preferably a support and a layer containing the metal ion releasing compound.

The dye providing element preferably comprises a first support and a first layer containing the methine dye, preferably one represented by Formulas (1) or (2). The image receiving element preferably comprises a second support and a second layer containing the metal ion releasing compound.

In another embodiment of the thermal transfer recording material, a dye providing element comprises a first support and a first layer containing the methine dye having 2 or more bonding positions capable of coordinate bond to a metal ion, and an image receiving element comprises a second support and a second layer containing the metal ion releasing compound which can release the metal ion. The methine dye and the metal ion form a metal chelate dye on the second layer when the first layer is superposed on the second layer and the thermal transfer recording material is heated thereafter.

An image is formed with a thermal transfer recording material comprising a dye providing element and an image receiving element. The method comprising steps of:
 (a) superposing a dye providing element on the image receiving element,
 (b) heating the superposed dye providing element corresponding to the image information, and
 (c) forming an image on the image receiving element with a metal chelate dye formed upon reaction of a metal ion releasing compound and a methine dye present in the thermal transfer recording material, wherein said methine dye has 2 or more bonding positions capable of coordinate bond to a metal ion released from the metal ion releasing compound at the bonding positions.

The metal chelate dye is used for an ink composition for an ink jet image recording process.

The metal chelate dye is used for a color toner for electrostatic image recording process, wherein the toner comprises the metal chelate dye and a resin.

DETAILED DISCLOSURE OF THE INVENTION

Figure 1:
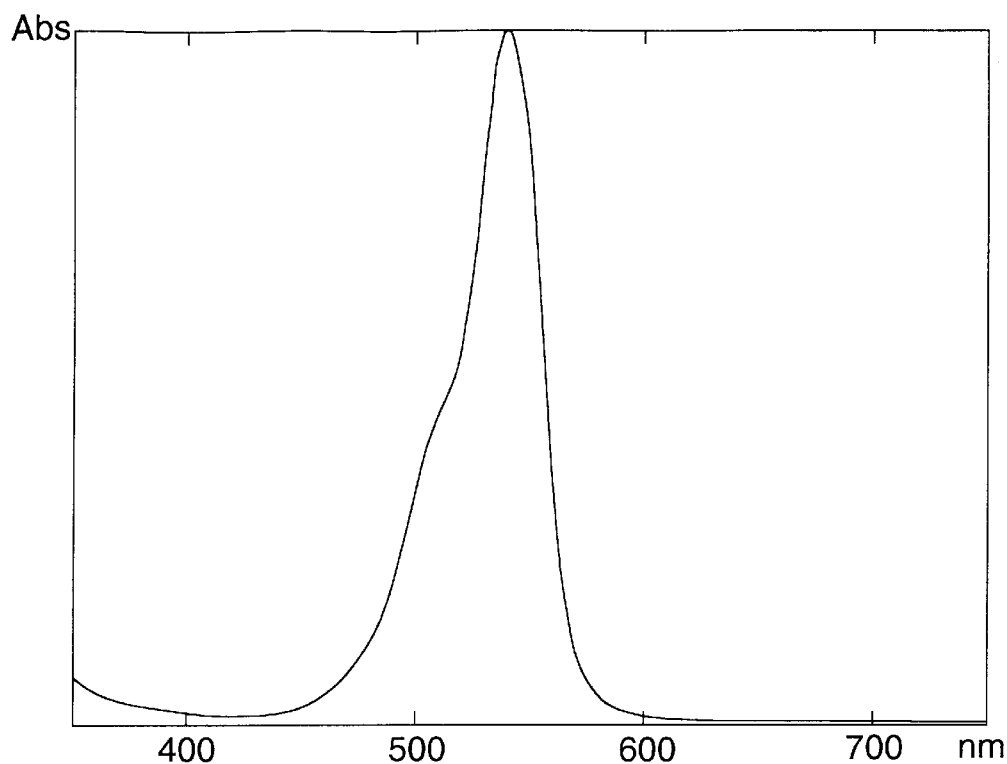
FIG. 1 shows an absorption spectrum of Dye D2-4.

The methine dye contains 2 or more bonding positions capable of coordinate bond to the metal ion at the bonding position, and preferably the atoms at the bonding positions of the methine dye are preferably nitrogen.

The more preferable methine dye is represented by the above-mentioned Formulas (1) or (2).

$X_1$ and $X_2$ is specifically preferably represented by the above-mentioned Formula (3).

In the formula (3) Z is a group of atoms forming a nitrogen-containing heterocyclic ring substituted with a group containing at least one chelatable nitrogen atom.

$Y_1$ and $Y_2$ each represents an aromatic group carbon ring or a group of atoms forming a heterocyclic ring. Preferably, $Y_1$, and $Y_2$ each represents a 5-membered or 6-membered aromatic group carbon ring or a group of atoms which forms a heterocyclic ring. Aforesaid ring may additionally have a substituent thereon. Practical examples of aforesaid ring include a benzene ring, a pyridine ring, a pyrimidine ring, a furan ring, a thiophene ring, a thiazole ring, an imidazole ring and a naphthalene ring. The above-mentioned rings may further form a condensed ring with another carbon ring (for example, a benzene ring) or a heterocyclic ring (for example, a pyridine ring). As a substituent on a ring, an alkyl group, an aryl group, an acyl group, an amino group, a nitro group, a cyano group, an acylamino group, an alkoxy group, a hydroxy group, an alkoxycarbonyl group and a halogen atom are cited. Such groups may further be substituted.

$X_1$ and $X_2$ is individually a group of atoms having 2 or more bonding positions capable of coordinate bond, being anything represented by Formula (1) which may form a dye can be used, preferably including 5-pyrazolone, imidazole, pyrazolopyrrole, pyrazolopyrazole, pyrazoloimidazole, pyrazolotriazole, pyrazolotetrazole, barbituric acid, thiobarbituric acid, rhodanine, hydantoine, thiohydantoine, oxazolone, isooxazolone, indanedione, pyrazolidinedione, oxazolidinedione, hydroxypyrridone and pyrazolopyrridone.

As $X_1$ and $X_2$ individually, those represented by the following Formulas (4) through (11) are specifically preferable.

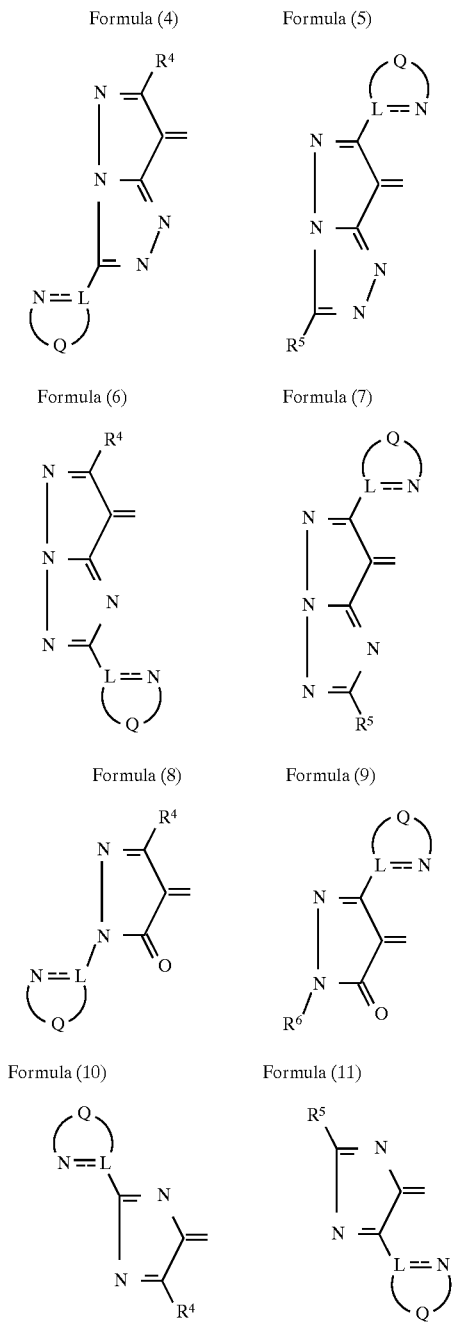

Formula (4), Formula (5), Formula (6), Formula (7), Formula (8), Formula (9), Formula (10), Formula (11)

wherein $R^4$, $R^5$, and $R^6$ independently represent a hydrogen atom or a monovalent substituent; L represents a carbon atom or a nitrogen atom; Q represents a group of atoms which forms a nitrogen-containing heterocyclic ring together with L; the nitrogen-containing heterocyclic ring capable of being formed together with L includes a pyrrole ring, a pyrrolidine ring, a pyrazole ring, an imidazole ring, an oxazole ring, a thiazole ring, a triazole ring, a thiazole ring, a triazole ring, a thiadiazole ring, a pyridine ring, a quinoline ring, a pyridazine ring, a pyrimidine ring, a pyradine ring, a triazine ring, an indole ring, a benzthiazole ring and a benzimidazole ring.

$R_1$, $R_2$, $R_3$, $R_{21}$, and $R_{22}$ in Formulas (1) and (2) and $R^4$ through $R^6$ in Formulas (4) through (11) independently represent a hydrogen atom, a halogen atom (a chlorine atom and a bromine atom), or a mono-valent substituent. As a mono-valent substituent, an alkyl group (for example, a methyl group, an ethyl group, an isopropyl group, a hydroxyethyl group, a methoxymethyl group, a trifluoromethyl group and a t-butyl group), a cycloalkyl group (for example, a cyclopentyl group and a cyclohexyl group), an aralkyl group (for example, a benzyl group and a 2-phenetyl group), an aryl group (for example, a phenyl group, a naphthyl group, a p-tolyl group and a p-chlorophenyl group), an alkoxy group (for example, a methoxy group, an ethoxy group, an isopropoxy group and an n-buthoxy group), an aryloxy group (for example, a phenoxy group), a cyano group, an acylamino group (for example, an acetylamino group and a propionylamino group), an alkylthio group (for example, a methylthio group, an ethylthio group and an n-butylthio group), an arylthio group (for example, a phenylthio group), a sulfonylamino group (for example, amethanesulfonylamino group and a benzenesulfonylamino group), an ureido group (for example, a 3-methylureido group, a 3,3-dimethylureido group and a 1,3-dimethylureido group), a sulfamoylamino group (a dimethylsulfamoylamino group), a carbamoyl group (for example, a methylcarbamoylgroup, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group (for example, a phenoxycarbonyl group), a sulfonyl group (for example, a methanesulfonyl group, a buthanesulfonyl group and a phenylsulfonyl group), an acyl group (for example, an acetyl group, a propanoyl group and a buthyloyl group), an amino group (a methylamino group, an ethylamino group and a dimethylamino group), a cyano group, a hydroxy group, a nitro group, a nitroso group, an amineoxide group (for example, a pyridine-oxide group), an imide group (for example, a phthalimide group), a disulfide group (for example, a benzenedisulfide group, a benzothiazolyl-2-disulfide group), a carboxyl group, a sulfoxy group, a sulfo group, a heterocyclic group (for example, a pyrizyl group, a benzimidazolyl group, a benzthiazolyl group and a benzoxazolyl group) are cited.

Hereunder, practical examples D1-1 through D1-40 of methine dyes which will be ligands for metal chelate dyes represented by Formulas (1) and (2).

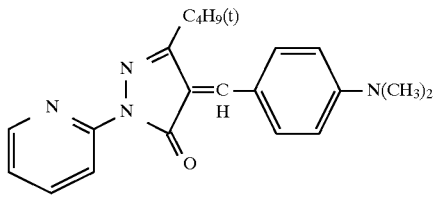

D1-1

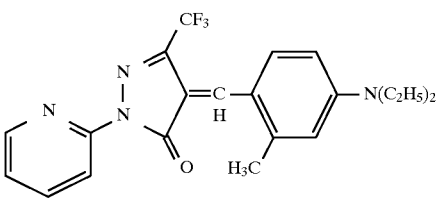

D1-2

-continued
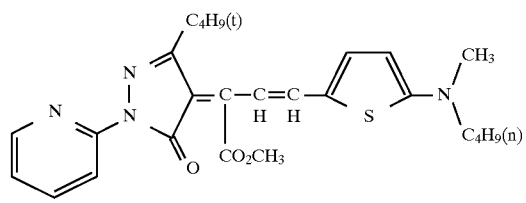
D1-3
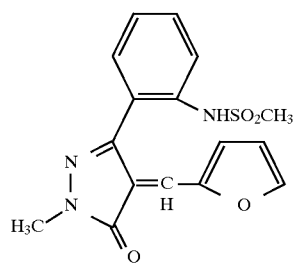
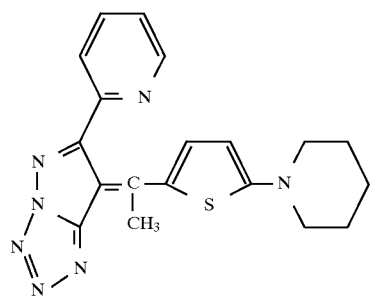
D1-5
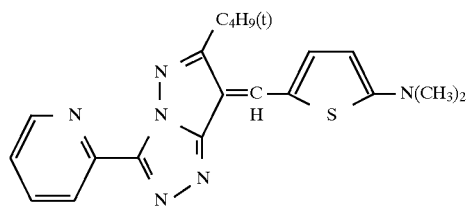
D1-6
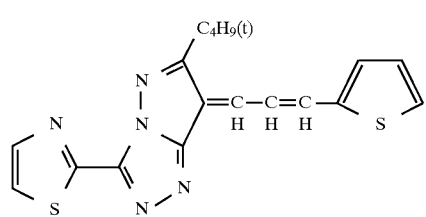
D1-7
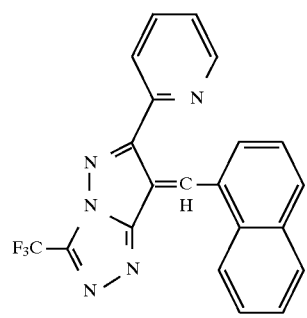
D1-8
-continued
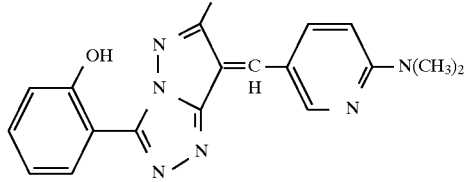
D1-9
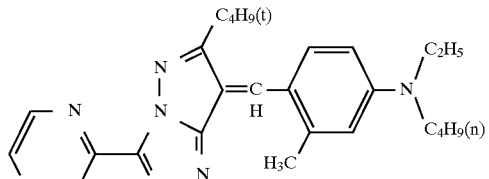
D1-10
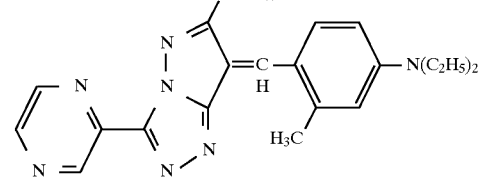
D1-11
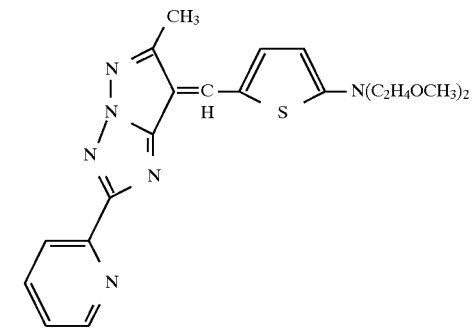
D1-12
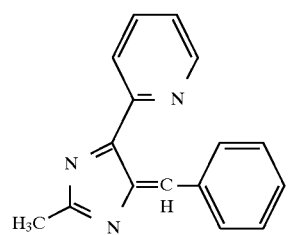
D1-13
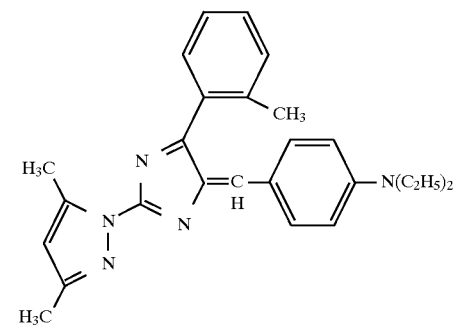
D1-14

-continued
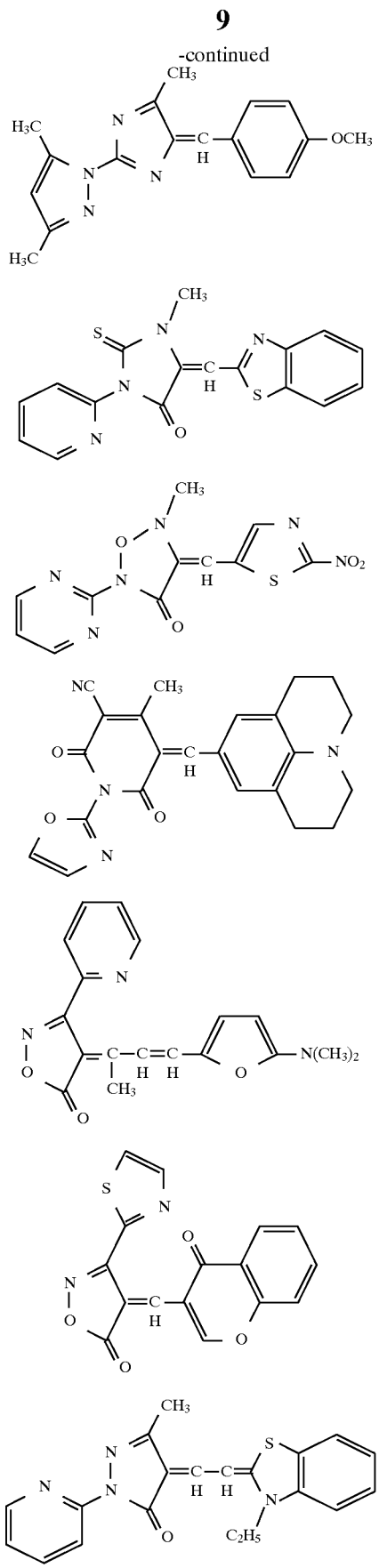
-continued
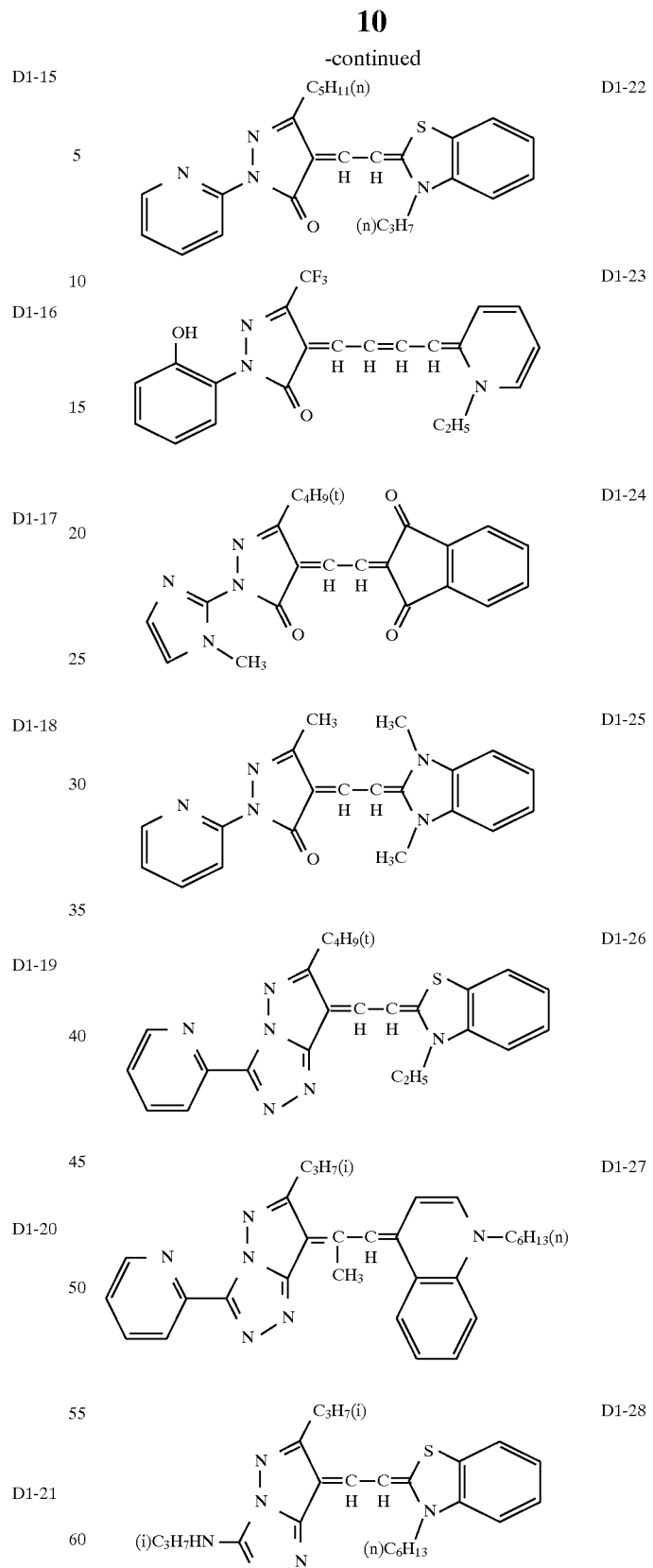

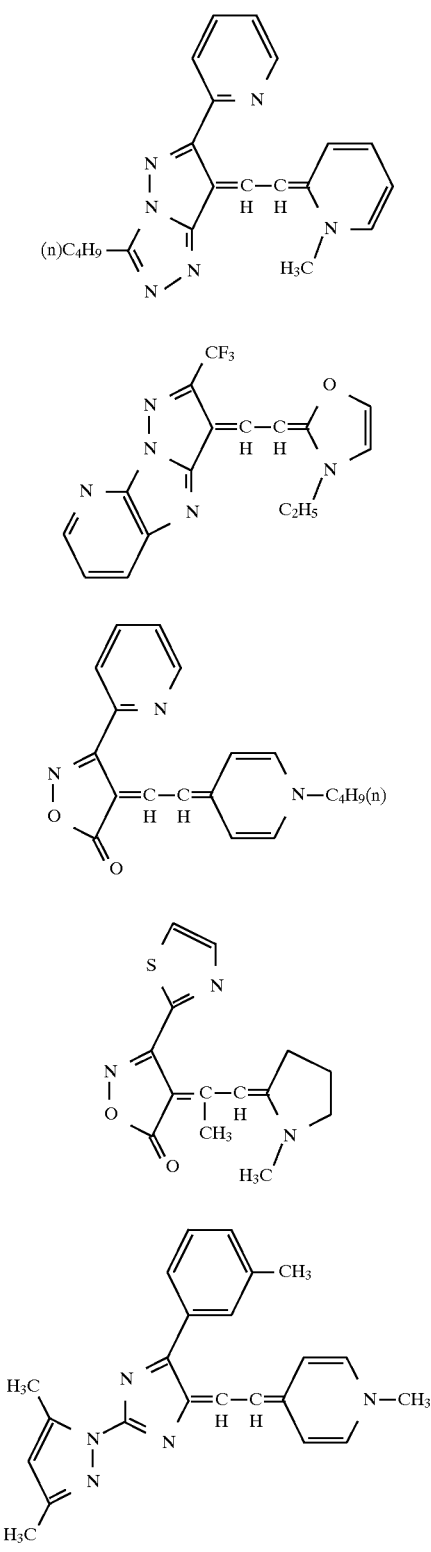
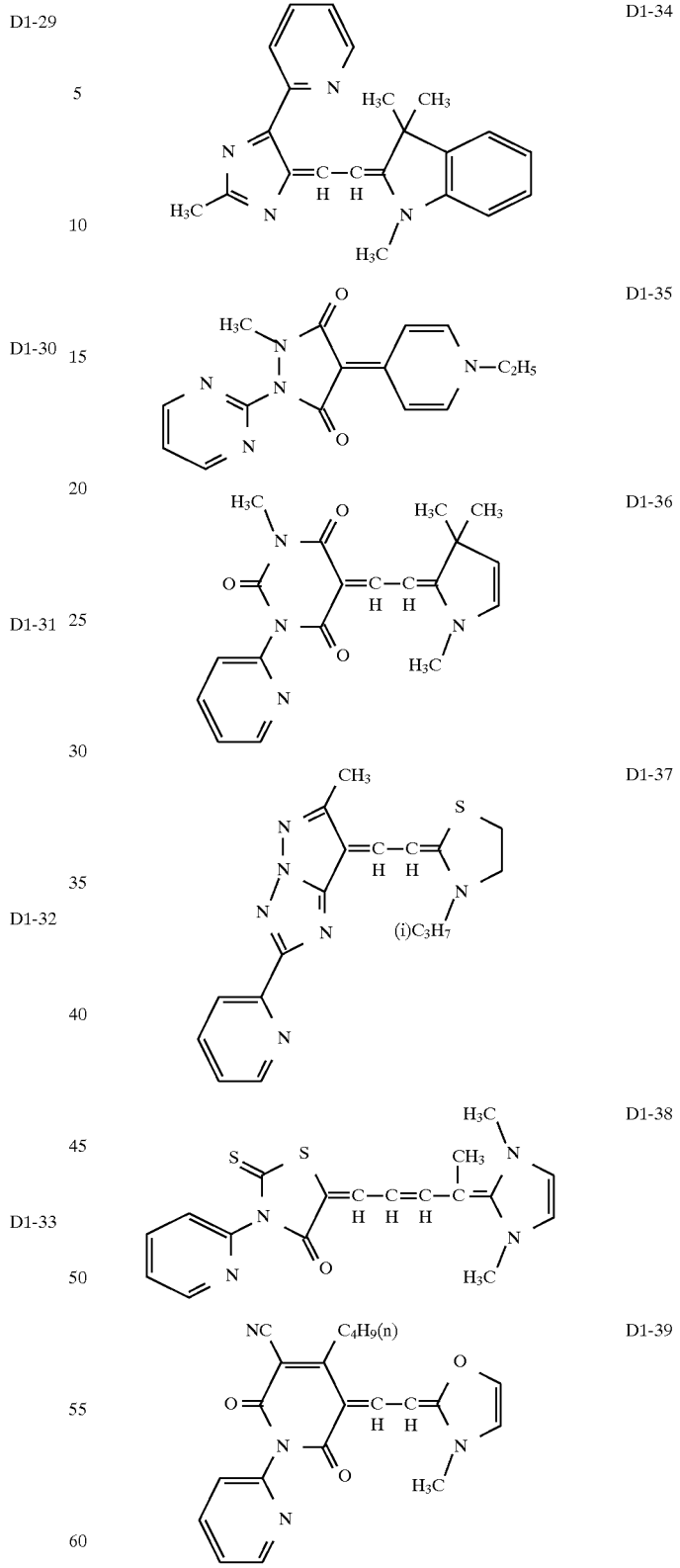

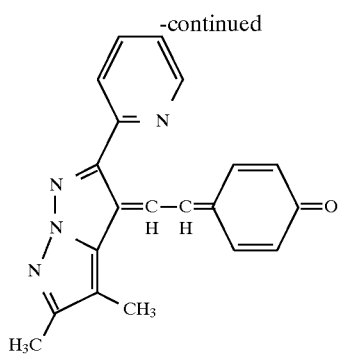
D1-40

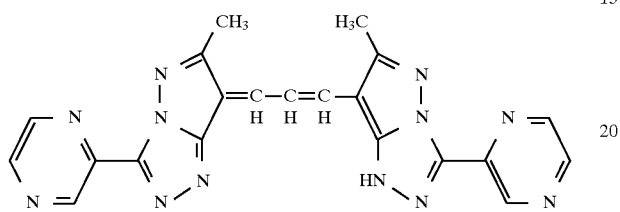
D1-41

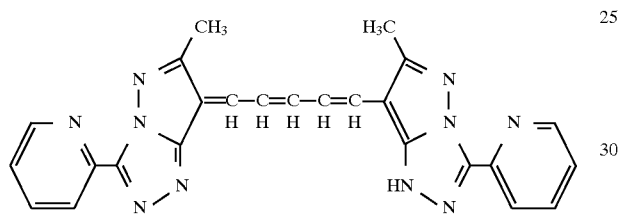
D1-42

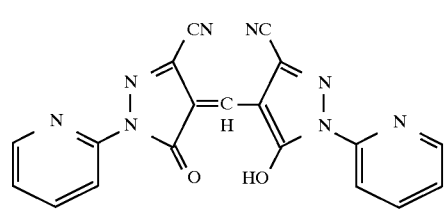
D1-43

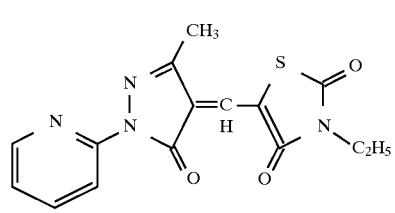
D1-44

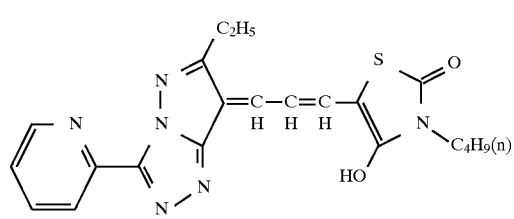
D1-45

As the above-mentioned metal ion containing compound, inorganic or organic salts of a metal ion and metal complex are cited. Among these, salts and complex of organic acid are preferable.

As a metal, monovalent and multi-valent metals belonging to the I through VIII group in the periodic table are cited. Of these, Al, Co, Cr, Cu, Fe, Mg, Mn, Mo, Ni, Sn, Ti and Zn are preferable. Specifically, Ni, Cu, Cr, Co and Zn are preferable.

As practical examples of metal ion containing compounds, aliphatic salts of $Ni^{2+}$, $Cu^{2+}$, $Cr^{2+}$, $Co^{2+}$ and $Zn^{2+}$ and acetic acid or stearic acid or aromatic acid salts of $Ni^{2+}$, $Cu^{2+}$, $Cr^{2+}$, $Co^{2+}$ and $Zn^{2+}$ and benzoic acid or salicylic acid are cited.

In addition, complexes represented by the following Formula (7) can preferably be used.

$$[M(Q1)l(Q2)m(Q3)n]^{P+}(Y^-)_P \qquad \text{Formula (7)}$$

wherein M represents a metal ion, preferably $Ni^{2+}$, $Cu^{2+}$, $Cr^{2+}$, $Co^{2+}$ and $Zn^{2+}$; Q1, Q2 and Q3, which may be the same or different, respectively represent a coordination compound capable of coordinate-bonding with a metal ion represented by M; these coordinations compounds may be selected from coordination compounds described in "Chelate Science" (5) (Nankohdo); $Y^-$ represents an organic anion group, and practically tetraphenyl boron anion and alkyl benzene sulfonic acid anion can be cited; l represents an integer of 1, 2 or 3, m represents 1, 2 or 0 and n represents 1 or 0, provided that they may be determined according to that a complex represented by the above-mentioned Formula (1) is tetradentate or octodentate or the number of ligands of Q1, Q2 and Q3; P represents 0, 1 or 2; and when P is 0, the coordination compound represented by Q is an anionic compound and an anionic compound represented by Q and the metal cations represented by M are electrically neutralized.

As the above-mentioned anionic compound, compounds represented by the following Formula (8) are preferable.
Formula (8)

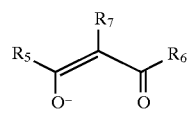

wherein $R_5$ and $R_6$, which may be the same or different, independently represent an alkyl group or an aryl group; $R_7$ represents an alkyl group, an alkoxy group, a halogen atom, an alkoxycarbonyl group and a hydrogen atom.

Practical examples D2-1 through D2-35 of metal chelate dyes of the present invention will be shown.

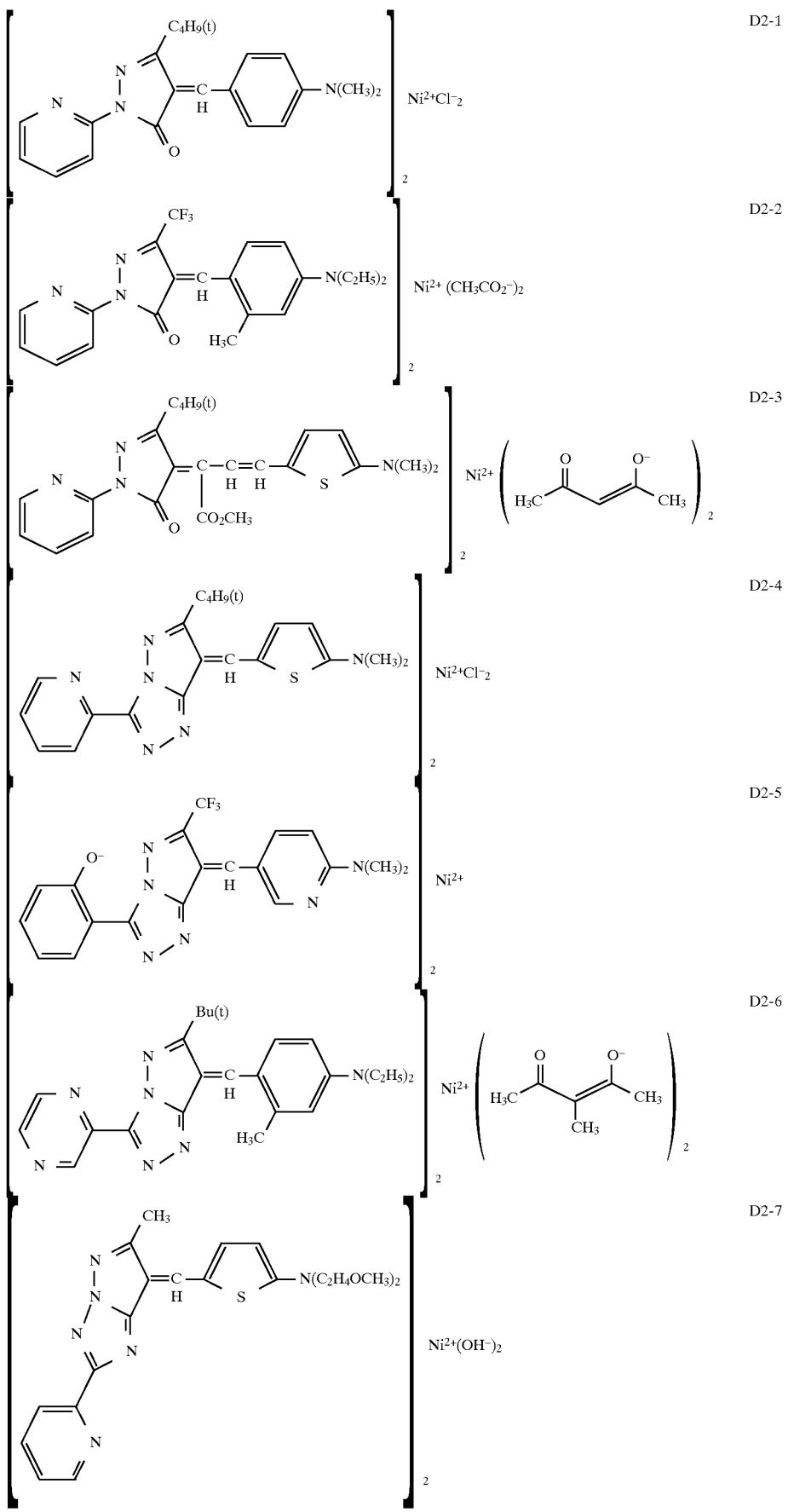

-continued
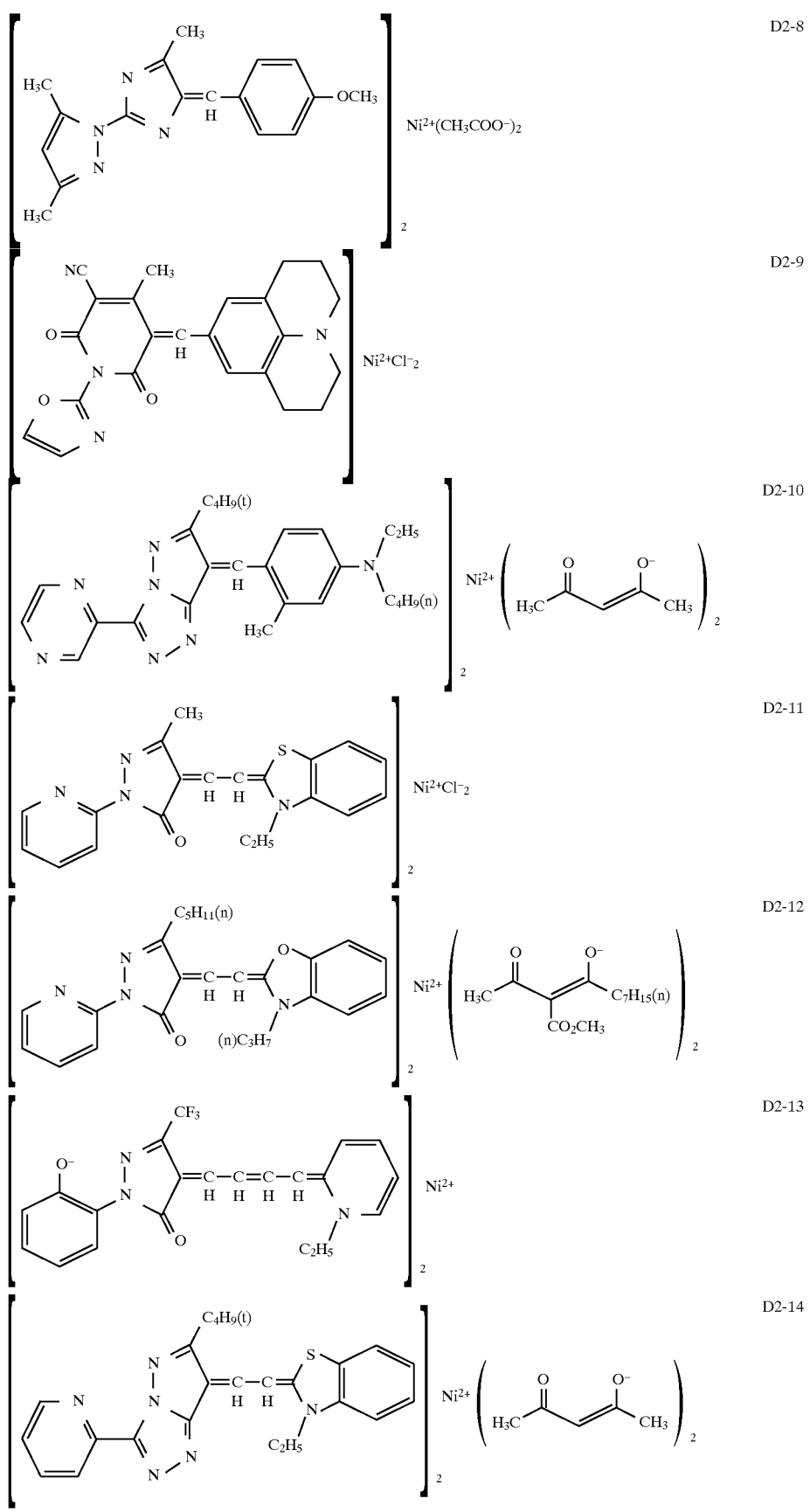

-continued
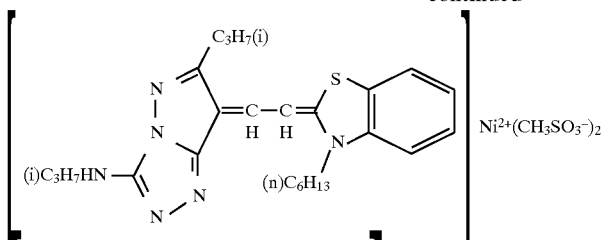 D2-15
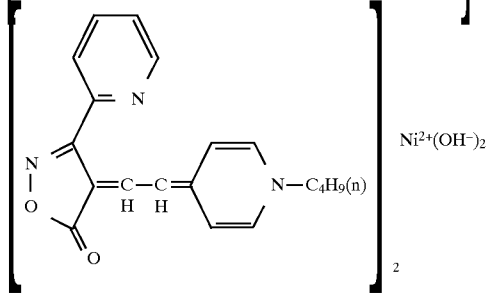 D2-16
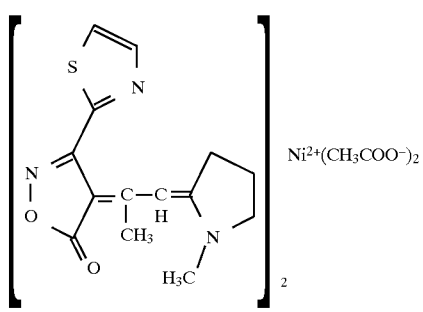 D2-17
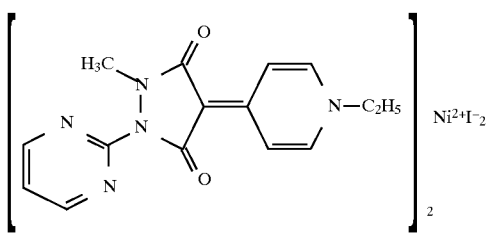 D2-18
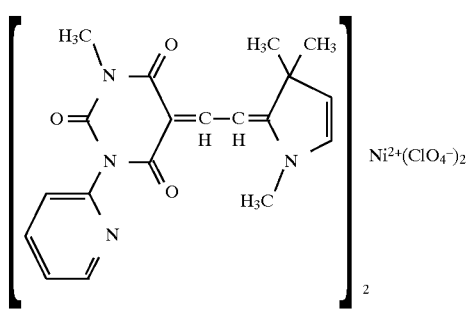 D2-19
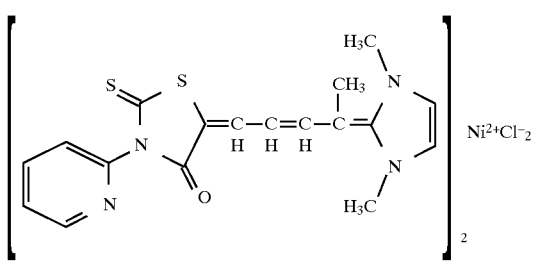 D2-20

-continued
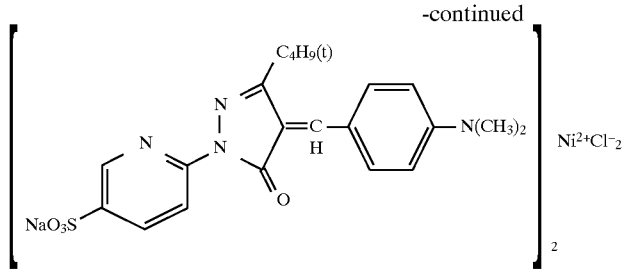
D2-21
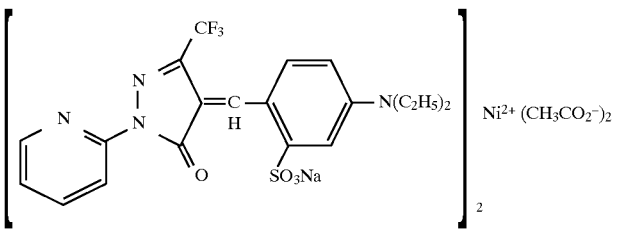
D2-22
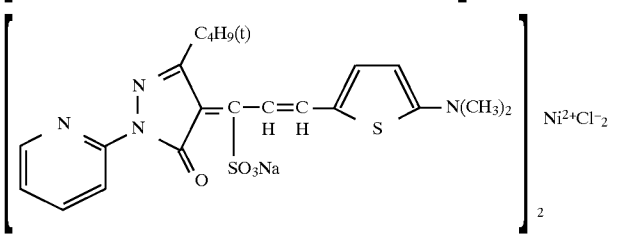
D2-23
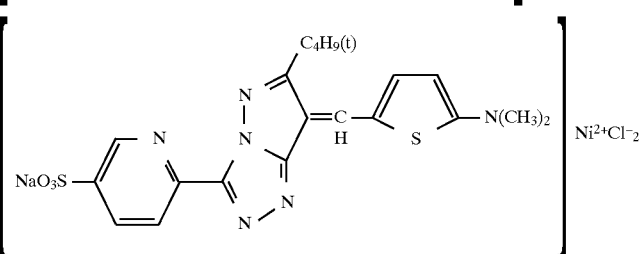
D2-24
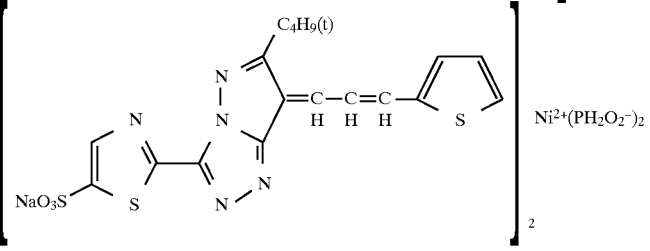
D2-25
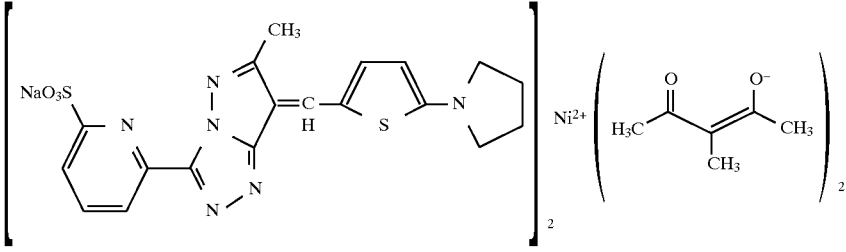
D2-26
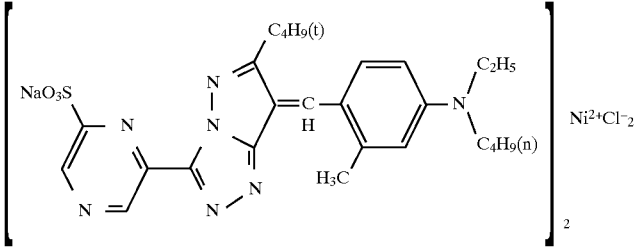
D2-27

-continued
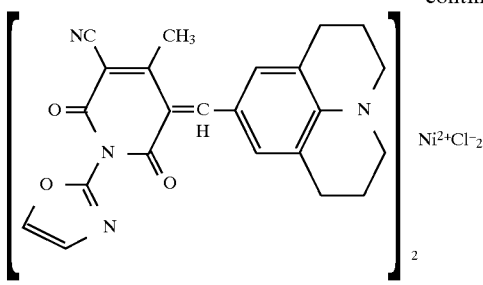 D2-28
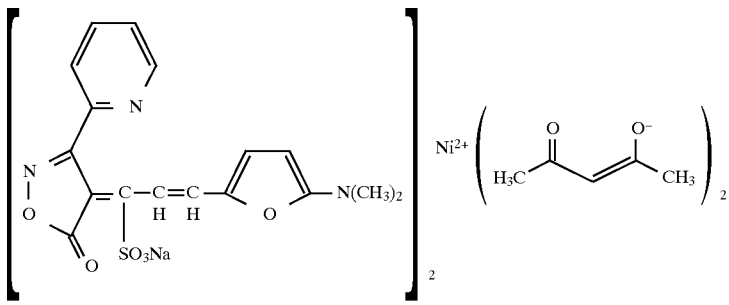 D2-29
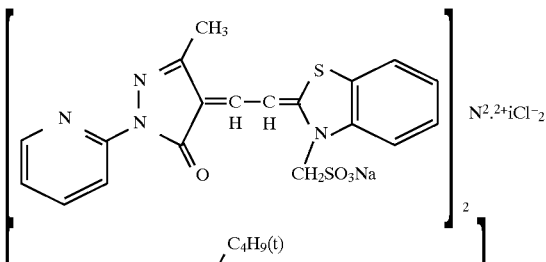 D2-30
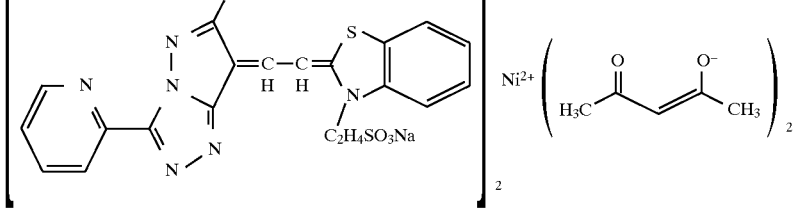 D2-31
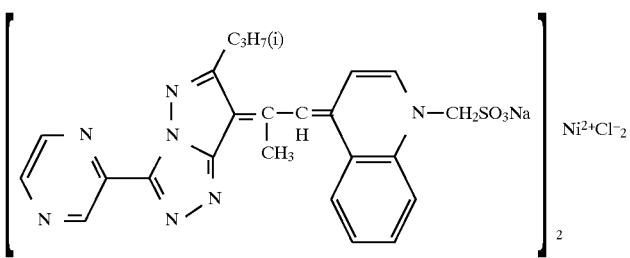 D2-32
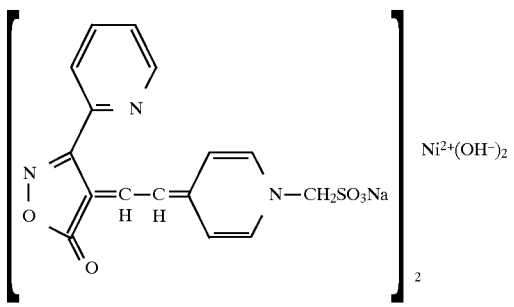 D2-33

-continued

D2-34
D2-35
D2-36
D2-37
D2-38
D2-39

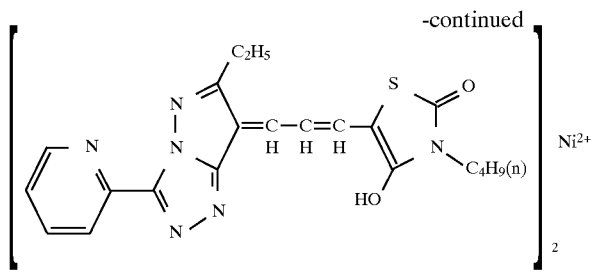

Hereinafter, synthesis examples will be shown. Synthesis Example 1 (Synthesis mechanism of illustrated dyes D1-6 and D2-4)

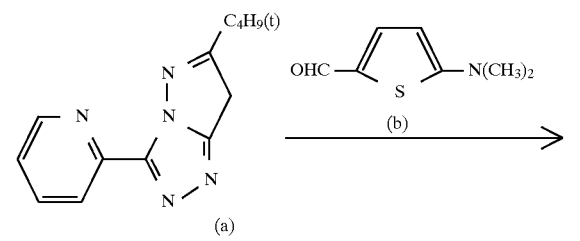

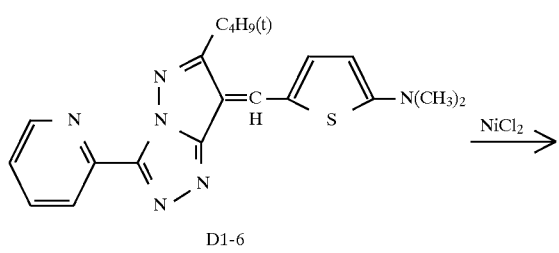

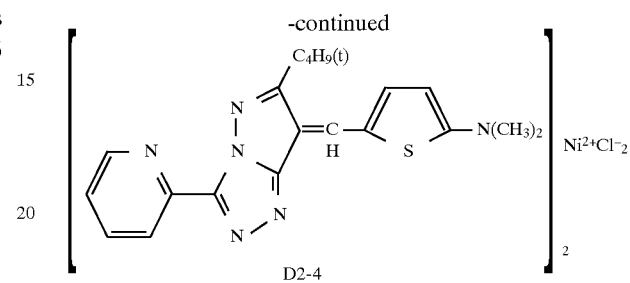

In 150 ml of toluene, 15 g of compound (a), compound (b) and 12 ml of pyperidine were added. The mixture was heated and refluxed for 3 hours. After that, the resulting mixture was chilled to room temperature. As a result, red crystals were coagulated. The coagulated material was filtrated and re-crystallized with ethanol so that 9.0 g of red crystals (D1-6) were obtained. By means of the NMR spectrum and the mass spectrum, it was identified to be an objective material. The absorption maximum of this D1-6 in acetone was 538 nm.

Next, 2.0 g of D1-6 was dissolved in 50 ml of methanol. To this, 0.62 g of octohydride of nickel chloride was added. After removing the solvent, acetonitrile was added. The crystals were filtrated, washed and dried so that 2.0 g of the objective metal chelate dye (compound D2-4) were obtained. The absorption maximum of this metal chelate dye in the acetone solution is 545 nm. The absorption spectrum of D2-4 is shown as FIG. 1.

Synthesis Example 2 (Synthesis mechanism of illustrated dyes D1-22 and D2-12)

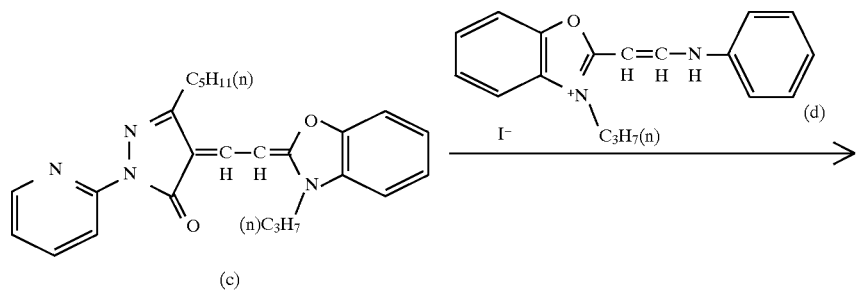

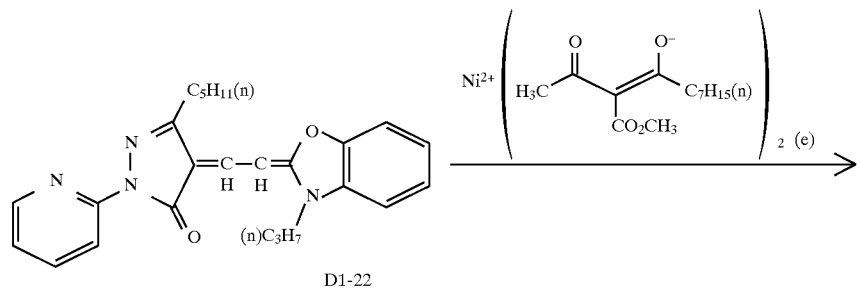

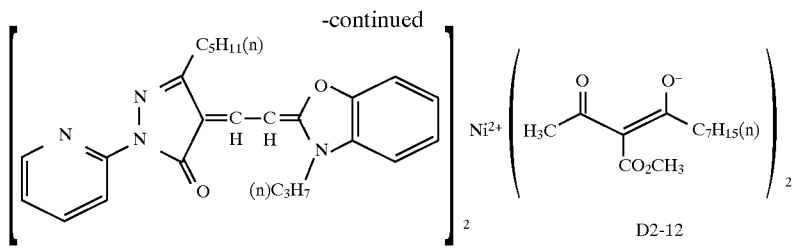

Into 30 ml of pyridine, 3.0 g of compound (c), 6.0 g of compound (d) and 3.0 ml of triethylamine were added. After heating and dissolving, 1.3 g of acetic acid anhydride was added thereto. The mixture was stirred for one hour at 80° C. in terms of temperature inside the vessel. The resulting mixture was chilled to room temperature, and was then, slowly added to a mixed solution of 35 ml of condensed hydrochloric acid and 100 ml of iced water little by little. As a result, coagulation of crystals was observed. This coagulated substance was filtrated, washed with distilled water and dispersed in 100 ml of ethyl acetic acid. This dispersed solution was neutralized with saturated sodium hydrogencarbonate while stirring. An ethyl acetic acid layer was washed with saturated salt water, and dried with sodium sulfate anhydride. After drying, the ethyl acetic acid layer was evaporated and condensed with a rotary evaporator, and then, re-crystallized with acetonitrile and 2.4 g of yellow crystals (compound D1-22) were obtained. By means of an NMR spectral and a mass spectral, it was confirmed that the yellow crystals are the object material. The absorption maximum of this compound (D1-22) in acetone was 455 nm.

Figure 2:
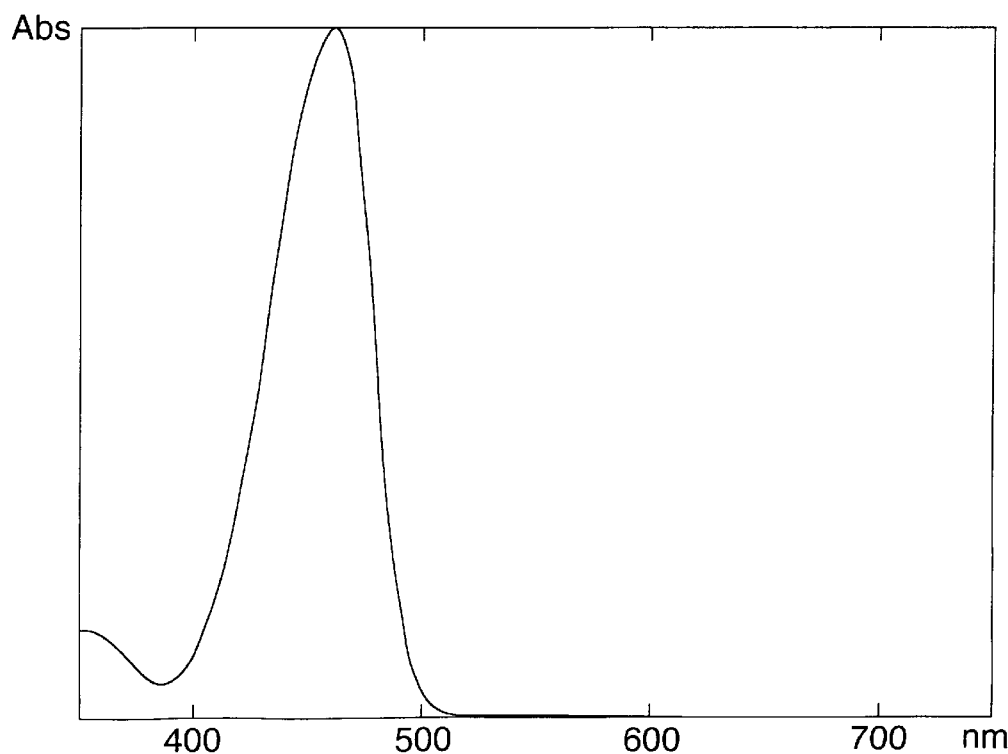
FIG. 2 shows an absorption spectrum of Dye D2-12.

The compound (D1-22) was dissolved in 50 ml of methanol. To this, 1.3 g of compound (e) was added. After removing the solvent, acetonitrile was added to the mixture. Then, the crystals were filtrated, washed and dried. Thus, 2.0 g of the objective metal chelate dye (D2-12) were obtained. The absorption maximum of this metal chelate dye in the acetone solution is 562 nm. The absorption spectrum of D2-12 is shown as FIG. 2.

The thermal transfer recording method ans a material therefor is described.

In the thermal transfer recording method of the present invention, when the thermal transfer recording material containing the metal chelate dye of the present invention is employed, after superposing a thermal transfer layer in the above-mentioned thermal transfer recording material and an image-receiving material, heat in accordance with image information is provided to the thermal transfer recording material so that images by means of the metal chelate dye of the present invention are caused to form on the image-receiving material.

In addition, in the thermal transfer recording method of the present invention, when the thermal transfer recording material containing a methine dye represented by Formula (1) or (2) is employed, after superposing a thermal transfer layer in the above-mentioned thermal transfer recording material and an image-receiving material, heat in accordance with image information is provided to the thermal transfer recording material so that images, by means of the metal chelate dye of the present invention, formed by reaction between a metal ion containing compound and the methine dye represented by Formula (1) or (2) are caused to form on the image-receiving material.

The metal ion containing compound may be present in the image receving element or may also be present in a thermofusing layer provided on the thermal transfer material.

In addition, in order to improve fixing property, an image receving element wherein an image has been formed may further be heated again.

The thermal transfer recording material of the present invention comprises a support provided thereon with a thermal transfer layer having a methine dye represented by Formulas (1) or (2) of the present invention or a metal chelate dye of the present invention. Aforesaid thermal transfer layer can be formed by coating an ink solution for forming a thermal transfer layer which was prepared by dissolving the dye of the present invention together with a binder in a solvent or by dispersing the dye of the present invention in a solvent in a fine particle state on a support and also by appropriately drying.

The thickness of the thermal transfer layer is preferably 0.1–10 μm.

As the above-mentioned binder, solvent-soluble polymers such as an acrylic resin, a methacrylic resin, polystyrene, polycarbonate, polysulfon, polyethersulfon, polyvinyl butylal, polyvinyl acetal, nitrocellulose and ethylcellulose are preferable.

These binders may be used by dissolving one or two or more thereof in an organic solvent. In addition, they may be used in the form of a latex dispersion.

Used amount of binder is preferably 0.1–20 g per 1 m² of a support.

As the above-mentioned organic solvent, alcohols (for example, ethanol and propanol), celsolves (for example, methylcelsolve), aromatic aromatics (for example, toluene and xylene), esters (for example, ester acetic acid), ketones (for example, acetone and methylethylketone) and ethers (for example, tetrahydrofuran and dioxane) are cited.

As the above-mentioned support, anything having dimension stability and heat fastness on a thermal head used when recording can be used. Thin paper such as condenser paper and a glassine paper and heat durable plastic film such as polyethylene terephthalate, polyamide and polycarbonate are preferably used.

The thickness of the support is preferably 2–30 μm. In addition, it is preferable that the support has a subbing layer composed of a polymer which is selected for the purpose of improvement of adhesiveness with the binder, transfer of a dye onto a support and preventing dyeing. In addition, a slipping layer may be provided for the purpose of preventing adhesion of the head onto the support.

The thermal transfer recording material of the present invention may have a thermo-melting layer containing a thermo-melting compound described in Japanese Patent O.P.I. Publication No. 106997/1984 on a thermal transfer layer or another layer on a support wherein the thermal transfer layer is not coated, for the purpose of employing a material such as plain paper wherein no image-receiving layer is specifically provided for the image-receiving material described later. As the thermo-melting compound, a colorless or a white compound which melts at 65°–150° C. including waxes such as carnauba wax, bees wax and candeline wax are cited.

In the above-mentioned thermo-melting layer, for example, polymers such as polyvinyl pyrrolidone, polyvinyl butylal, polyester and vinyl acetic acid may be incorporated.

When the thermal transfer recording material of the present invention is applied to a thermal transfer recording material capable of recording full color images, it is preferable to coat totally three layers, i.e., a cyan thermal transfer layer containing a cyan dye used in the present invention, a magenta thermal transfer layer containing a thermo-diffusion magenta dye capable of forming magenta images and a yellow thermal transfer layer containing a thermo-diffusion yellow dye capable of forming yellow images on the identical surface of a support repeatedly. In addition, totally four layer, i.e., the above-mentioned three layers and a thermal transfer layer containing a black image forming substance may be coated on the identical surface on the support repeatedly as necessary.

In one embodiment of the thermal transfer recording method of the present invention, after superposing the thermal transfer layer of the above-mentioned thermal transfer recording material and the image-receiving material, heat in accordance with image information is applied to the thermal transfer recording material so that images due to the chelate dye formed through reaction between a metal ion containing compound and the dye of the present invention are formed on the image-receiving material.

The metal ion-containing compound may be present in the image-receiving material, or may also be present in the thermo-melting layer provided on the thermal transfer material.

The amount of metal ion-containing compounds are preferably 0.5–20 g/m$^2$ and more preferably 1–15 g/m$^2$ compared to an image-receiving material or a thermo-melting layer.

The above-mentioned image-receiving material used in the present invention comprises a support made of paper, plastic film or paper-plastic film complex material provided thereon with, as an image-receiving layer, a polyester resin, a polyvinyl chloride resin, a copolymer of vinyl chloride and other monomers (for example, vinyl acetic acid) or one kind of or two or more kinds of polymer layers such as polyvinyl butylal, polyvinyl pyrrolidone and polycarbonate.

In the image-receiving material, on an image-receiving layer, a protective layer may be provided in order to prevent fusing. Further, between the support and the image-receiving layer, an intermediate layer may be provided for the purposes of adhesion, heat insulation or cushioning effect. In addition, the above-mentioned support itself may be an image-receiving material.

An ink for ink jet recording proxess is described.

It is preferable that a metal chelate dye contained in an ink jet recording ink of the present invention has a group which functions as an ionic hydrophilic group in an alkali region of pH 8 or more.

An ink jet recording ink containing a metal chelate dye of the present invention may employ various solvent such as a water-based ink, an oil-based ink and solid (phase change) ink. It is specifically preferable to use the water-based ink as the solvent.

The water-based ink generally employs, as a solvent, water and a water-solubilizing organic solvent in addition to the dye of the present invention. As examples of the water-solubilizing organic solvent, alcohols (for example, methanol, ethanol, propanol, isopropanol, butanol, isobutanol, secondary butanol, tertiary butanol, pentanol, hexanol, cyclohexanol and benzyl alcohol), multi-valent alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol and thiodiglycol), multi-valent alcohol ethers for example, ethylene glycol monomethyl ether, ethylene glycol monoethyl ether, ethylene glycol monobuthyl ether, diethylene glycol monomethyl ether, diethylene glycol monoethyl ether, diethylene glycol monobuthyl ether, propylene glycol monomethyl ether, prolylene glycol monobuthyl ether, ethyleneglycol monomethyl ether acetate, triethylene glycol monomethyl ether, triethylene glycol monoethyl ether, ethylene glycol monophenyl ether and propylene glycol monophenyl ether), amines (for example, ethanol amine, diethanol amine, triethanol amine, N-methyldiethanol amine, N-ethyldiethanol amine, morphorine, N-ethyl morphorine, ethylene diamine, diethylene diamine, triethylene tetraamine, tetraethylene pentaamine, polyethylene imine, pentamethyldiethylene triamine and tetramethylpropylene diamine), amides (for example, formamide, N,N-dimethylformamide and N,N-dimethylacetoamide), heterocyclic rings (for example, 2-pyrrolidone, N-methyl-2-pyrrolidone, cyclohexyl pyrrolidone, 2-oxazolidone and 1,3-dimethyl-2-imidazolidinone), sulfoxides (for example, dimethyl sulfoxide), sulfones (for example, sulforane), urea, acetonitrile and acetone are cited.

In the above-mentioned water-based ink, a dye may be employed by being dissolved as it is if it is soluble in aforesaid solvent. On the contrary, if the dye is an insoluble solid, it may be dispersed in the solvent with a polymer disperser or a surfactant after powdering the dye to fine particles with various disperser (for example, a ball mill, a sand mill, an attriter, a roll mill, an agitator mill, a Henshel mixer, a colloid mill, a ultrasonic homogenizer, a pal mill, a jet mill and an Ongue mill) or after dissolving the dye in a soluble organic solvent. When the dye is a insoluble liquid or a semi-fused material, it can be dissolved in the solvent with a polymer dispersant or a surfactant as it is or after dissolving in a soluble organic solvent. Practical adjustment methods of such a water-based ink are disclosed in Japanese Patent O.P.I. Publication Nos. 148436/1993, 295312/1993, 97541/1995, 82515/1995 and 118584/1995.

Oil-based inks employ, as a solvent, an organic solvent in addition to the dye of the present invention.

Examples of a solvent for an oil-based ink include, in addition to those exemplified as water-solubilizing organic solvent in the above-mentioned water-based ink, alcohols (for example, pentanol, heptanol, octanol, phenylethyl alcohol, phenylpropyl alcohol, furfuryl alcohol and anyl alcohol), esters (for example, ethylene glycol diacetate, ethylene glycol monomethyl ether acetate, diethylene glycol monomethyl ether acetate, propylene glycol diacetate, acetic acid ethyl, acetic acid amyl, acetic acid benzyl, benzoic acid ethyl, benzoic acid butyl, laurinic acid butyl, mystinic acid isopropyl, phosphoric acid triethyl, phosphoric acid tributyl, phthalic acid diethyl, phthalic acid dibutyl, maloic acid diethyl, maloic acid dipropyl, diethyl maloic acid diethyl, succinic acid diethyl, succinic acid dibutyl, glutaric acid diethyl, adipinic acid diethyl, adipinic acid dipropyl, adipinic acid dibutyl, adipinic acid di(2-methoxyethyl), sebacic acid diethyl, maleic acid diethyl, maleic acid dibutyl, maleic acid dioctyl, phmalic acid diethyl, phmalic acid dioctyl and cinnamic acid-3-hexenyl), ethers (for example, butylphenyl ether, benzyl ethyl ether and hexyl ether), ketones (for example, benzylmethyl ketone, benzyl acetone, diacetone alcohol and cyclohexanone), hydrocarbons (for example, oil ether, oil benzyl, tetralin, decalin, tertiaryamyl benzene and dimethyl naphthaline) and amides (for example, N,N-diethyl dodecane amide).

In the above-mentioned oil-based ink, the dye may be employed as it is after dissolving, or it may also be dispersed or dissolved by the use a resin type dispersant or a binder in combination.

With regard to practical preparation methods of the above-mentioned oil-based ink, see Japanese Patent O.P.I. Publication Nos. 231975/1991 and 508883/1993.

A solid (phase change) ink employs a phase change solvent, in addition to the ink of the present invention, which is solid at room temperature and fused liquid when heated and sprayed.

As a phase change solvent, natural waxes (for example, beeswax, carnauba wax, rice wax, wood wax, hohoba oil, whale wax, candelilla wax, lanoline, montane wax, ozokerite, selesine, paraffin wax, microcrystalline wax and petrolactam), polyethylene wax derivatives, chlorinated hydrocarbon, organic acids (for example, balmitinic acid, stearic acid, behenic acid, tiglic acid, 2-acetonaphthone behenic acid, 12-hydroxy stearic acid and dihydroxystearic acid), organic acid esters (for example, organic acid ester with alcohol such as glycerin, diethylene glycol and ethylene glycol), alcohols (for example, dodecanol, tetradecanol, hexadecanol, eicosanoldocosanol, tetracosanol, hexacosanol, octacosanol, dodesenol, myricyl alcohol, tetrasenol, hexadesenol, eicosenol, docosenol, pinen glycol, hinokiol, butindiol, nonanediol, isophthalyl alcohol, mesicerin, tereaphthalyl alcohol, hexanediol, decanediol, dodecanediol, tetradecanediol, hexadecanediol, docosanediol, tetracosanediol, terebeneol, phenyl glycerin, eicosane diol, octanediol, phenyl propylene glycol, bisphenol A and paraalfacmyl phenol), ketones (for example, benzoyl acetone, diacetobenzene, benzophenone, tricosanone, heptacosanone, heptatriacontanone, hentriacontanone, heptatriacontanone, stearone, laurone and dianysol), amides (for example, oleinic acid amide, laurylic acid amide, stearic acid amide, recinoleic acid amide, palmitinic acid amide, tetrahydrofuranic acid amide, erucic acid amide, myrystinic acid amide, 12-hydroxystearyc acid amide, N-stearyl erucic acid amide, N-oleil stearynic acid amide, N,N'-ethylene bislaurynic acid amide, N,N'-ethylenebisstearynic acid amide, N,N'-ethylene bisoleinic acid amide, N,N'-methylenebisstearynic acid amide, N,N'-ethylenebisbehenic acid amide, N,N'xylilene bisstearyc acid amide, N,N'-butylene bisstearynic acid amide, N,N'-dioleiladipinic acid amide, N,N'-distearyl adipinic acid amide, N,N'-dioleil sebasinic acid amide, N,N'-distearyl sebasinic acid amide, N,N'-distearyl terephthalic acid amide, N,N'-distearyl isophthalic acid amide, phenacetin, tolamide, acetoamide, reacted product tetraamide of dimer acid such as oleic acid dimer/ethylene diamine/stearylic acid (1:2:2 in terms of mol ratio), diamine and fatty acid, sulfone amide (for example, paratoluene sulfon amide, ethylbenzene sulfon amide and butylbenzene sulfon amide), silicones (for example, silicone SH6018 (produced by Toray Silicone), Silicone KR215, 216 and 220 (produced by ShinEtsu Silicone), cumarones (for example, Eschrone G-90 (produced by Japan Steel Chemical)), cholsterol fatty acid ester (for example, stearynic acid cholesterol, balmitinic acid cholesterol, myrystinic acid cholesterol, behenic acid cholesterol, laurynic acid cholesterol and melissic acid cholesterol), succharide fatty acid ester (for example, stearynic acid saccharose, balmitinic acid saccharose, behenic acid saccharose, laurynic acid saccharose, melissic acid saccharose, stearynic acid ractose, balmitinic acid ractose, myrystinic acid ractose, behenic acid ractose, laurynic acid ractose and melissic acid ractose) are cited.

The phase change temperature of the solid ink in solid-liquid phase is preferably 60° C. or more and specifically preferably 80°–150° C.

In the above-mentioned solid ink, the dye of the present invention may be dissolved and used as it is in a solvent after heated and fused, and may also be used after dispersing or dissolving using a resin type dispersant or a binder in combination.

With regard to a practical adjustment method of the above-mentioned solid ink, see Japanese Patent O.P.I. Publication Nos. 186723/1993 and 70490/1995.

The viscosity of the above-mentioned water-based, oil-based and solid-based ink when being ejected is preferably 40 cps or less and more preferably 30 cps or less.

The surface tension of the ink of the present invention when being ejected is preferably 20 dyn/cm or more and more preferably 30–80 dyn/cm$^2$.

The dye of the present invention is preferably used in a range of 1–25 wt %, and more preferably used in a range of 0.5–10 wt % compared to the total ink amount.

To the ink of the present invention, a viscosity regulator, a surface tension regulator, a specific resistance regulator, a layer former, a dispersant, a surfactant, a UV rays absorber, an anti-oxidant, an anti-color fading agent, an anti-mildew agent and an anti-rust agent may be added for the purposes of discharge stability, as appropriate for the print head or ink cartridge, storage stability, image stability and other various performances.

There is no specifically limit to a recording system for the ink of the present invention. Specifically, it can be used as a on-demand type ink jet printer. As the on-demand type, electro-mechanical conversion type (for example, a single cavity type, a double cavity type, a vendor type, a piston type, a shared-mode type and a shared wall type), an electricity-heat conversion type (for example, a thermal ink jet type and a bubble jet type), an electrostatic absorption type (for example, an electric field control type and a slit jet type) and a discharge type (for example, a spark jet type are practically cited.

A color toner for the use of electrostatic image recording process is described.

In the color toner of the present invention, the added amount of the metal chelate dye of the present invention to the toner is 0.01–15 part by weight and preferably 1.0–10 parts by weight against a binder resin.

As a binder resin for toner, all binders conventionally used can be used. For example, styrene-containing resins, acrylic-containing resins, styrene/acrylic-containing resins and polyester-containing resins are cited.

In the present invention, for the purposes of improvement of toner fluidity and charge control of toner, inorganic fine particles and organic fine particles may be added. Silica fine particles and titania fine particles wherein the surface is processed with a coupling agent containing an alkyl group are preferably used. Incidentally, the average primary particle size by number was preferably 10–500 nm and it is preferably added to toner by 0.1–20 wt %.

As a parting agent, all parting agents conventionally used can be used. Practically, olefins such as low-molecular-weight polypropylene, low-molecular-weight polyethylene and ethylene-propylene copolymers, microcrystalline waxes, carnauba wax, sazol wax and paraffin wax are cited. Their adding amount is preferable 1–5 wt % in toner.

A charge controlling agent may be added as necessary. From viewpoint of coloring property, colorless ones are preferable. For example, quartenary ammonium salt structure one and calix alene structure ones are cited.

As a carrier, both of non-laminated carrier constituted only of magnetic material particles such as iron and ferrite and resin-laminated carriers wherein the surface of magnetic material particles are laminated with resins are acceptable. The average particle size by volume of carrier is preferably 30–150 $\mu$m.

The image forming method to which the toner of the present invention is applied is not specifically restricted. For example, a method wherein, after color toner is repeatedly formed on a photoreceptor, transfer is conducted for forming images and a method wherein images formed on a photoreceptor is successively transferred onto an intermediate transfer material and, after color images are formed on an intermediate transfer material, aforesaid images are transferred onto an image forming medium such as paper for forming color image.

EXAMPLE

Hereinafter, the present invention will be explained in detail by referring to examples.

Example 1

Preparation of an Ink

The following materials were mixed so that a uniform ink solution containing a dye of the present invention was obtained. The solubability of the dye and its suitability as an ink were favorable.

| | |
|---|---|
| Illustrated dye (D1-1) | 0.72 g |
| Polyvinyl acetal resin (KY-24, produced by Denki Kagaku Chemical Ind. Co., Ltd.) | 1.08 g |
| Methylethylketone | 26.4 ml |
| Toluene | 1.6 ml |

Preparation of the Thermal Transfer Recording Material

The above-mentioned ink was coated on a 4.5 $\mu$m polyethylene terephthalate base with a wire bar in such a manner that the coated amount after being dried would be 2.3 g/m$^2$, and was then dried. Thus, a thermal transfer recording material-1 comprising a thermal transfer layer on a polyethylene terephthalate film was formed.

Incidentally, on a rear surface of the above-mentioned polyethylene terephthalate base, a nitro cellulose layer containing a silicone-degenerated urethane resin (SP-2105, produced by Dainichi-Seika Co. Ltd.) is applied as an antisticking layer. In the same manner as above, thermal transfer recording materials 2–11 employing the methine dye of the present invention as shown in Table 1 were manufactured.

Preparation of the Image-receiving Material

On a support (a white pigment (TiO$_2$) and a bluing agent are contained on a polyethylene layer on one side) wherein polyethylene was laminated on both sides of a paper, a coating solution having the following component was coated in such a manner that the coated amount after being dried would be 7.2 g was coated and subsequently dried so that image receving element-1 was formed.

In addition, image receving element-2 having the same composition as image receving element-1 except that the metal ion containing compound was removed from image-receiving material-1 was formed.

| | |
|---|---|
| Metal ion containing compound (shown as follows) | 4.0 g |
| Polyvinyl butylal resin (BX-1, produced by Sekisui Chemical Ind. Co. Ltd.) | 6.0 g |
| Polyester-degenerated silicone | 0.3 g |

$$Ni^{2+} \left( C_7H_{15} \underset{O}{\overset{COOCH_3}{\diagup\!\!\diagdown}} \underset{O^-}{\overset{CH_3}{\diagup}} \right)_3$$

Thermal Transfer Recording Method

The above-mentioned thermal transfer recording material and the image receving element were superposed and a thermal head was applied from the rear surface of the thermal transfer recording material for conducting image recording by means of a thermal printer so that images 1–12 having excellent gradation were obtained. After recording, the maximum density of image, sensitivity of the recording material and image storage stability were evaluated in accordance with the following conditions. Table 1 shows the results thereof.

Evaluation of maximum density: The maximum reflection density (ordinarily, a portion where the imprinting time was max.) was measured by means of an X-rit 310 TR.

Evaluation of sensitivity: Relative imprinting energy of each material provided that the imprinting energy when the density of image formed by means of the thermal transfer recording material-11 was defined to be 1.0 was measured. The smaller the numeral is, the higher the sensitivity is.

Evaluation on image storage stability: The resulting image was subjected to light irradiation for 5 days with a Xenon Fadometer for evaluating light fastness. Table 1 shows the results of dye residual ratio (image storage stability) after the image was irradiated.

Incidentally, the dye residual ratio (image storage stability) was represented by D/C0×100, provided that the density before the image was irradiated was D0 and the density after the image was irradiated was D.

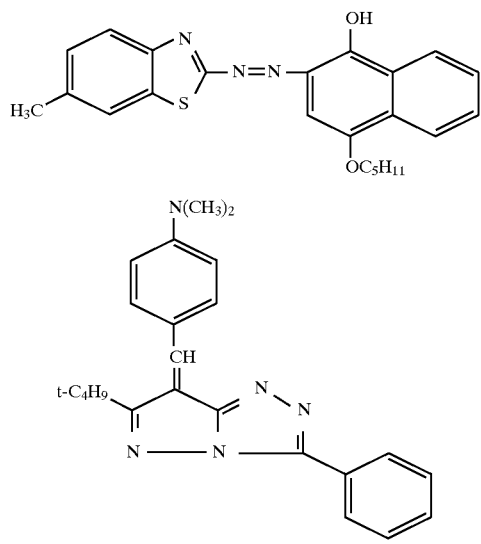

TABLE 1

| Image No. | Thermal transfer recording material | Dye | Image-receiving material | Maximum density | Sensitivity | Image storage stability |
|---|---|---|---|---|---|---|
| 1 | 1 | D1-1 | 1 | 2.56 | 0.65 | 92.3% |
| 2 | 1 | D1-1 | 2 | 2.23 | 0.80 | 20.5% |
| 3 | 2 | D1-3 | 1 | 2.65 | 0.60 | 94.2% |
| 4 | 3 | D1-6 | 1 | 2.83 | 0.57 | 96.5% |
| 5 | 4 | D1-11 | 1 | 3.03 | 0.51 | 92.0% |
| 6 | 5 | D1-14 | 1 | 2.88 | 0.55 | 97.1% |
| 7 | 6 | D1-21 | 1 | 2.91 | 0.58 | 94.4% |
| 8 | 7 | D1-22 | 1 | 3.01 | 0.52 | 95.1% |
| 9 | 8 | D1-26 | 1 | 2.63 | 0.60 | 93.9% |
| 10 | 9 | D1-27 | 1 | 2.88 | 0.52 | 95.2% |
| 11 | 10 | A | 1 | 2.08 | 1.00 | 92.3% |
| 12 | 11 | B | 1 | 2.17 | 0.80 | 22.8% |

As shown in Table 1, the thermal transfer recording material employing the dyes of the present invention has high sensitivity, and it can offer images with high sensitivity and favorable image storage stability specifically by reacting with a metal ion containing compound and thereby chelate images are formed on an image-receiving material.

Example 2

On a PET base which was used as a support for the transfer recording material in Example 1, an ink layer containing a dye for forming a yellow image forming (illustrated dye D1-22)(added amount was 0.5 g/m$^2$), an ink layer containing the following dye for forming a magenta image (illustrated dye D1-11)(the added amount was 0.5 g/m$^2$) and an ink layer containing a dye for forming a cyan image forming (illustrated dye A)(added amount was 0.5 g/m$^2$) were coated successively on a support. Incidentally, the binder for each ink layer was the same as one used in Example 1. Following this, image receving element 1 used in Example 1 and the above-mentioned dye providing element were laminated. The layered material was subjected to full color image recording by means of a full color printer CP3000D produced by Nikon so that a thermal transfer image was obtained. In addition, in the same manner as in the above-mentioned Example 1, a comparative dye providing element was prepared for full color image recording. The above-mentioned image dye and dye providing elements were subjected to the same evaluation as in Example 1. Table 2 shows the results thereof. Dye C (a compound described in Japanese Patent Publication No. 44917/1992)

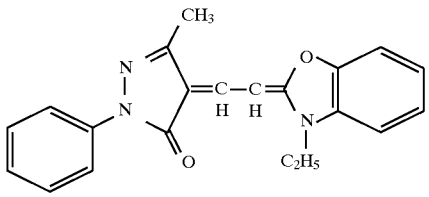

TABLE 2

| Image No. | Thermal transfer recording material | Dye | Image-receiving material | Maximum density | Image storage stability |
|---|---|---|---|---|---|
| 1 | 1 | D1-22, D1-11, A | 1 | 2.83 | 92.3% |
| 2 | 2 | C, D1-11, A | 1 | 2.53 | 20.5% |

As is apparent from Table 2, the metal chelate dye of the present invention is a dye having excellent image storage stability.

Example 3

Table 3 shows the metal chelate dye of the present invention, absorption maximum of dye not forming a metal complex in acetone as a comparative sample and mol light absorption coefficient (the metal chelate dye was measured pre one molecule of dye constituting).

TABLE 3

| | Metal chelate dye | | Dye before metal forming complex | |
|---|---|---|---|---|
| | Absorption maximum | ε max | Absorption maximum | ε max |
| Dye of the Inv. (D2-3) | 638 nm | 144400 | 609 nm | 64600 |
| Dye of the Inv. (D2-4) | 545 nm | 104300 | 538 nm | 76300 |
| Dye of the Inv. (D2-6) | 546 nm | 91800 | 522 nm | 69000 |
| Dye of the Inv. (D2-12) | 462 nm | 79600 | 455 nm | 59700 |
| Dye of the Inv. (D2-14) | 538 nm | 99000 | 536 nm | 73500 |

As is apparent from Table 3, the metal chelate dye of the present invention is a dye having great mol light absorption coefficient. By forming the metal complex, an excellent dye having great mol light-absorption coefficient is resulted in.

Example 4

Preparation of Thermo-fusible Type Thermal Transfer Recording Material

The composition containing material listed below were dispersed by mixing with heating by means of a sand grinder to prepare coating composition for the thermo-fusible ink layer containing coloring material. Amount is shown as parts by weight.

| Coating composition for ink layer | |
|---|---|
| Paraffin Wax (HNP-11, Product by NIPPON SEIRO CO., LTD) | 2 parts |
| Rosin resin (DS-90, Product by HARIMA CHEMICALS, INC.) | 3 parts |
| Ethylene-vinylacetate copolymer (EVERFLEX EV210, Product by Mitsui-DuPont Chemical Co., LTD.) | 1 part |
| Metal chelate compound (D2–6) | 2 parts |

The coating composition was coated on a polyethylene-terephthalate film support having 6 micrometer thickness by means of hot melt gravure coating to obtain an ink layer of 1.5 micrometer thickness to prepare a thermo-fusible type thermal transfer recording material. The polyethylene-terephthalate film support had a nitrocellulose layer containing silicon modified urethane resin (SP-2105 Product by Dainichi Seika Co., LTD) as a backing layer on the opposite side of the ink layer.

Coated paper (Beck smoothness; 2000 sec) was used as an image receiving element. The side having an ink layer of the prepared thermo-fusible type thermal transfer recording material is superposed on the coated paper, and then they were heated by a thermal head provided to the back side of the thermal transfer recording material under the following condition. A clear image made of metal chelate dye was obtained.

Recording Condition

Record density: 8 dot/mm for main and sub scanning direction

Recording Power: 0.6 W/Dot

Heating Time: 20 msec or longer (adjusted 20 msec plus every 0.2 msec stepwisely)

Example 5

Preparation of Thermo-fusible Type Thermal Transfer Recording Material

The composition containing material listed below were dispersed by mixing with heating by means of a sand grinder to prepare coating composition for the thermo-fusible ink layer containing coloring material. Amount is shown as parts by weight.

| Coating composition for ink layer | |
|---|---|
| Paraffin Wax (HNP-11, Product by NIPPON SEIRO CO., LTD.) | 2 parts |
| Rosin resin (DS-90, Product by HARIMA CHEMICALS, INC.) | 3 parts |
| Ethylene-vinylacetate copolymer (EVERFLEX EV210, Product by Mitsui-DuPont Chemical Co., LTD.) | 1 part |
| Photo-thermo converting material (Kayasorb IR820B, Product by NIPPON KAYAKU CO., LTD.) | 2 parts |
| Metal chelate compound (D2–6) | 2 parts |

The coating composition was coated on a polyethylene-terephthalate film support having 6 micrometer thickness by means of hot melt gravure coating to obtain an ink layer of 1.5 micrometer thickness. The polyethylene-terephthalate film support had a nitrocellulose layer containing silicon modified urethane resin (SP-2105 Product by Dainichi Seika Co., LTD) as a backing layer on the opposite side of the ink layer.

Coated paper (Beck smoothness; 2000 sec) was used as an image receiving element. The side having an ink layer of the prepared thermo-fusible type thermal transfer recording material is superposed on the coated paper, and then they were irradiated with a semiconductor laser (LT090MD/MF, Product by Sharp Corp.) at the back side of the thermal transfer recording material under the following condition. A clear image made of metal chelate dye was obtained.

Recording Condition

Irradiation energy density: 1.2 mJ/mm$^2$

Spot radius of a laser beam: 16.0 $\mu$m

Scanning pitch: 10.0 $\mu$m

After recording a patch pattern in the size of 5 cm square by irradiating with the laser light, the image receiving element was peeled from the thermo-fusible type thermal transfer recording material to form an image. The formed image was exposed by the infrared flash lamp, so as to complete a color extinction reaction of the Photo-thermo converting material on the image, and pure magenta color image without color mixture was obtained.

Example 6

Using each ink component having composition described in Table 4, a sample wherein images were recorded on a super fine paper MJSP1 (produced by Seiko Epson Co., Ltd.) exclusively for ink jet was obtained with an ink jet printer MJ-5000C (electro-mechanical conversion type, produced by Seiko Epson Co., Ltd.).

Table 1 shows the results of evaluation on light fastness and color tone using aforesaid sample. Incidentally, the unit of each compound amount in Table 1 is wt % against the amount of ink.

Light Fastness:

It is represented by reduction ratio of reflective spectral density of a sample after subjecting to exposed to light for 24 hours using a Xenon Fademeter a the maximum absorption wavelength in a visible area compared to an unexposed sample.

Light fastness (%)=(Maximum absorption wavelength density of an exposed sample/Maximum absorption wavelength density of an unexposed sample)×100

TABLE 4

| No. | Dye number | Amount of dye | Solvent 1 | Solvent 2 | Surfactant 1 | Ion exchanged water | Light fastness | Color tone | Remarks |
|---|---|---|---|---|---|---|---|---|---|
| 1 | D2-23 | 1.4 | 19.0 | 9.0 | 0.6 | 70.0 | 95 | Vivid cyan | Inv. |
| 2 | D2-24 | 1.4 | 19.0 | 9.0 | 0.6 | 70.0 | 99 | Vivid magenta | Inv. |
| 3 | D2-30 | 1.4 | 19.0 | 79.0 | 0.6 | 0 | 97 | Vivid yellow | Inv. |
| 4 | D2-31 | 1.4 | 19.0 | 9.0 | 0.6 | 70.0 | 98 | Vivid magenta | Inv. |
| 5 | D2-32 | 1.4 | 19.0 | 9.0 | 0.6 | 70.0 | 93 | Vivid cyan | Inv. |
| 6 | Comp. 1 | 1.4 | 19.0 | 9.0 | 0.6 | 70.0 | 73 | Dark magenta | Comp. |
| 7 | Comp. 2 | 1.4 | 19.0 | 9.0 | 0.6 | 70.0 | 21 | Vivid magenta | Comp. |

Solvent 1: Diethylene glycol
Solvent 2: Triethylene glycol monobutyl ether
Comp. 1: C.I. Acid Red 52
Comp. 2: C.I. Direct Red 20
Surfactant 1: Surfynol 465 (produced by Air Products and Chemicals Inc.)

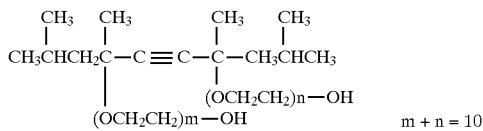

$m + n = 10$

Incidentally, when an exclusive luster film MJSP4 (produced by Seiko Epson) was used in place of super fine exclusive paper MJSP1 as a recording medium too, similar favorable results were obtained.

In addition, it was also used in a continuous discharging test in the present printer too. It could be confirmed that the ink of the present invention has high fidelity on the electricity-mechanic conversion system.

Example 7

Preparation of Exemplified Samples
<Colorants>

| Metal chelate dye of the invention | D2–12, S2–4 and D2–3 |
|---|---|
| Y pigment 1 for comparison | C.I. PIGMENT YELLOW 10 |
| Y pigment 2 for comparison | C.I. PIGMENT YELLOW 17 |
| Y pigment 3 for comparison | C.I. PIGMENT YELLOW 154 |
| Y pigment 4 for comparison | C.I. PIGMENT YELLOW 185 |
| Y dye 1 for comparison | C.I. SOLVENT YELLOW 29 |
| M pigment 1 for comparison | C.I. PIGMENT RED 57:1 |
| M pigment 2 for comparison | C.I. PIGMENT RED 81:1 |
| M pigment 3 for comparison | C.I. PIGMENT RED 122 |
| M dye 1 for comparison | C.I. SOLVENT RED 152 |
| C pigment 1 for comparison | C.I. PIGMENT BLUE 1 |
| C pigment 2 for comparison | C.I. PIGMENT BLUE 15:3 |
| C dye 1 for comparison | C.I. SOLVENT BLUE 38 |
| C dye 2 for comparison | C.I. SOLVENT BLUE 70 |

<Production of Color Toner>

One hundred parts of polyester resin, colorants whose parts number are described as follows and 3 parts of polypropylene were mixed, kneaded, crushed and classified so that powder whose average particle size was 8.5 μm was obtained. In addition, 100 parts of the above-mentioned powder and 1.0 parts of silica fine particles (the particle size was 12 nm and the degree of hydrophobicity was 60) were mixed in a Henshel mixer for obtaining a color toner.

| Number of parts of colorants added | | |
|---|---|---|
| Yellow | Dye of the present invention D2–12 | 4 parts |
| | Y pigment and dye for comparison | 8 parts |
| Magenta | Dye of the present invention D2–4 | 2 parts |
| | M pigment and dye for comparison | 8 parts |
| Cyan | Dye of the present invention D2–3 | 2 parts |
| | C pigment and dye for comparison | 3 parts |

<Production of Carrier>

Forty g of copolymer fine particles wherein styrene methylmethacrylate was 6:4 and 1960 g of Cu—Zn ferrite particles wherein specific gravity was 5.0, average particle size by weight was 45 μm and saturation magnetization when 100 oersted external magnetic field was impressed were charged in a high speed stirrer type mixer and the mixture was mixed for 15 minutes at the mixture temperature of 30° C. Following this, the mixture temperature was raised to 105° C. and mechanical shock force was repeatedly provided for 30 minutes, and then the mixture was chilled so that a carrier was produced.

<Production of Developers>

By the use of a V-shaped mixer, 418.5 g of the above-mentioned carrier and 31.5 g of each toner were respectively mixed for 20 minutes so that developers for actual copying tests were produced.

<Evaluation Apparatus and Conditions>

In the Example, as an image forming apparatus, Konica 9028 (produced by Konica) was used for actual copying evaluation.

<Evaluation Items and Evaluation Method>

By the use of developers employing the color toners of the present invention, a reflective image (an image on paper) and a transmitting image (an OHP image) were formed on paper and on an OHP sheet by means of the above-mentioned image forming method, and they were then evaluated by the following methods. Incidentally, the amount of toner added was evaluated in a range of 0.7±0.05 (mg/cm²).

Saturation

By the use of a Macbeth Color-Eye 7000, saturation of an image on a paper produced was measured, and compared.

Light-fastness

After conducting an exposure test for 7 days by the use of Xenon Long Life Weatherometer (Xenon Arc Lamp, 7000 lux at 44.0° C.) produced by Suga Tester Co., Ltd., color difference of images with images before testing was measured using the Macbeth Color-Eye 7000, and compared.

Transparency

Transparency of the OHP image was evaluated by the following method. By means of Self-Recording Spectrometer Photometer Model 330 produced by Hitachi Seisakusho, visible spectrotransmissivity of an image was measured with an OHP sheet wherein toner is not carried as a reference so that spectrotransmissivity ratio at yellow of 570 nm, magenta of 650 nm and cyan 500 nm were measured, which was used as parameters of transparency of the OHP image.

Hue Change

Using the Macbeth Color-Eye 7000, hue differences of each paper and OHP images produced were measured and compared.

<Results of Evaluation>

Table 5 shows the results thereof.

TABLE 5

| | Dye or C.I. No. of the invention | Degree of saturation | Light fastness | Transmissivity | Hue change |
|---|---|---|---|---|---|
| Inv. 1 | D2-12 | 98.4 | 0.1 | 78.9 | −2.0 |
| Comp. 1 | C.I. PIGMENT YELLOW 10 | 74.2 | 0.1 | 61.1 | −6.5 |
| Comp. 2 | C.I. PIGMENT YELLOW 17 | 84.4 | 0.1 | 60.5 | −2.8 |
| Comp. 3 | C.I. PIGMENT YELLOW 154 | 69.4 | 0.2 | 60.4 | −5.7 |
| Comp. 4 | C.I. PIGMENT YELLOW 185 | 97.7 | 1.1 | 46.1 | −8.0 |
| Comp. 5 | C.I. PIGMENT YELLOW 29 | 92.2 | 0.8 | 73.3 | 11.9 |
| Inv. 2 | D2-4 | 80.9 | 0.1 | 70.0 | −9.8 |
| Comp. 6 | C.I. PIGMENT RED 57:1 | 70.1 | 2.1 | 55.0 | −11.4 |
| Comp. 7 | C.I. PIGMENT RED 81:1 | 75.4 | 4.5 | 57.3 | −30.5 |
| Comp. 8 | C.I. PIGMENT RED 122 | 75.2 | 0.1 | 64.1 | −13.3 |
| Comp. 9 | C.I. PIGMENT RED 155 | 76.1 | 6.4 | 69.4 | −12.4 |
| Inv. 3 | D2-3 | 58.8 | 0.1 | 87.6 | −11.8 |
| Comp. 10 | C.I. PIGMENT BLUE 1 | 55.8 | 2.4 | 70.3 | −22.4 |
| Comp. 11 | C.I. PIGMENT BLUE 15:3 | 53.1 | 0.1 | 82.1 | −35.4 |
| Comp. 12 | C.I. PIGMENT BLUE 38 | 50.0 | 7.0 | 85.6 | −36.7 |
| Comp. 13 | C.I. PIGMENT BLUE 70 | 48.4 | 8.2 | 84.4 | −12.5 |

As is apparent from Table 5, the color toners of the present invention offer high fidelity color reproduction and high OHP quality even if a colorant is not applied in advance. Accordingly, the color toner of the present invention is suitable for a full color toner. In addition, since it has favorable light fastness, it is possible to provide images which can be stored for a long time.

Owing to the present invention, a metal chelate dye, a thermal transfer recording material, a thermal transfer recording method, an ink jet recording solution and a color toner which are excellent in terms of stiffness against light, heat and humidity and having excellent color reproducibility can be provided.

We claim:

1. A metal chelate dye comprising a metal ion and a ligand that is a methine dye having 2 or more bonding positions capable of coordinate bond to the metal ion at the bonding position wherein the methine dye is represented by formula (1) or (2)

wherein $Y_1$ is a group of atoms forming an aromatic hydrocarbon ring or a heterocyclic ring, $Y_2$ is a group of atoms forming a 5 or 6 membered aromatic hydrocarbon ring or heterocyclic ring, $R_1$, $R_2$, $R_3$, $R_{21}$, and $R_{22}$ are individually a hydrogen atom or a monovalent substituent, n and m are individually 0, 1 or 2, $X_1$, and $X_2$ individually, are represented by Formulas (4) through (11), Formula (4)   Formula (5)

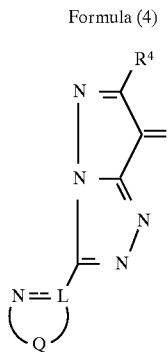 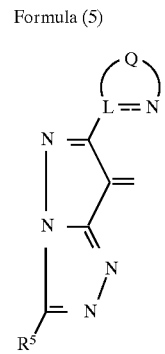

Formula (6)   Formula (7)

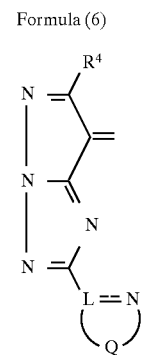 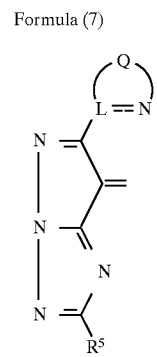

Formula (8)   Formula (9)

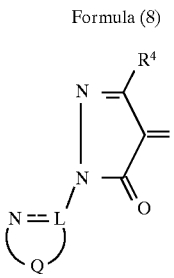 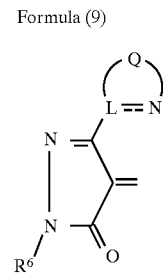

Formula (10) 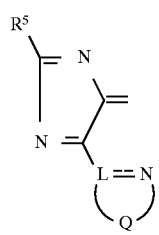 Formula (11) 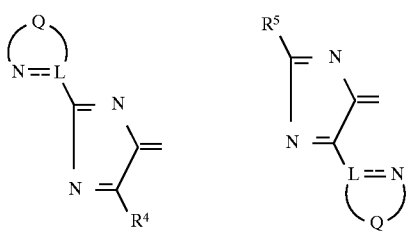

wherein $R^4$, $R^5$, and $R^6$ independently represent a hydrogen atom or a monovalent substituent, L represents a carbon atom or a nitrogen atom; Q represents a group of atoms which forms a nitrogen-containing heterocyclic ring together with L.

2. A metal chelate dye of claim 1 wherein $X_1$ and $X_2$ is represented by

Formula (4)   Formula (9)

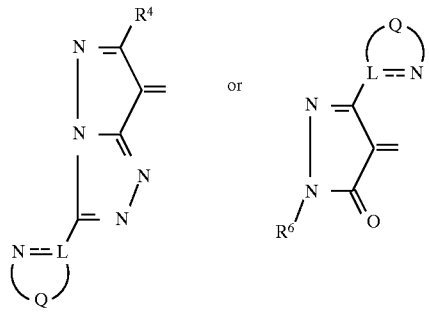

wherein $R^4$ represents a hydrogen atom or a monovalent substituent; L represents a carbon atom or a nitrogen atom; Q represents a group of atoms which forms a nitrogen-containing heterocyclic ring together with L.

3. The metal chelate dye of claim 1 wherein said nitrogen-containing heterocyclic ring capable of being formed together with L is selected from the group consisting of a pyrrole ring, a pyrrolidine ring, a pyrazole ring, an imidazole ring, an oxazole ring, a thiazole ring, a triazole ring, a thiadiazole ring, a pyridine ring, a guinoline ring, a pyridazine ring, a pyrimidine ring, a pyradine ring, a triazine ring, an indole ring, a benzthiazole ring, and a benzimidazole ring.

4. The metal chelate dye of claim 2 wherein said nitrogen-containing heterocyclic ring capable of being formed together with L is selected from the group consisting of a pyrrole ring, a pyrrolidine ring, a pyrazole ring, an imidazole ring, an oxazole ring, a thiazole ring, a triazole ring, a thiadiazole ring, a pyridine ring, a quinoline ring, a pyridazine ring, a pyrimidine ring, a pyradine ring, a triazine ring, an indole ring, a benzthiazole ring, and a benzimidazole ring.

* * * * *